US010455848B2

(12) United States Patent
Herbert et al.

(10) Patent No.: US 10,455,848 B2
(45) Date of Patent: Oct. 29, 2019

(54) INDIVIDUAL FROZEN DRINK DISPENSER

(71) Applicant: ISLAND OASIS FROZEN COCKTAIL CO., INC., Walpole, MA (US)

(72) Inventors: John Michael Herbert, Winchester, MA (US); Bryan Hotaling, Harvard, MA (US); Matt Naples, Acton, MA (US); Patrick Devine, Townsend, MA (US)

(73) Assignee: Island Oasis Frozen Cocktail Company, Inc., Walpole, MA (US)

( * ) Notice: Subject to any disclaimer, the term of this patent is extended or adjusted under 35 U.S.C. 154(b) by 124 days.

(21) Appl. No.: 15/631,424

(22) Filed: Jun. 23, 2017

(65) Prior Publication Data

US 2017/0280745 A1 Oct. 5, 2017

Related U.S. Application Data

(63) Continuation-in-part of application No. 14/541,909, filed on Nov. 14, 2014, now Pat. No. 9,717,264.
(Continued)

(51) Int. Cl.
*A23G 9/28* (2006.01)
*A47J 43/046* (2006.01)
(Continued)

(52) U.S. Cl.
CPC ............... *A23G 9/28* (2013.01); *A23G 9/045* (2013.01); *A23G 9/12* (2013.01); *A23G 9/224* (2013.01);
(Continued)

(58) Field of Classification Search
CPC .......... A23G 9/045; A23G 9/12; A23G 9/224; A23G 9/28; A47J 31/407; A47J 43/046;
(Continued)

(56) References Cited

U.S. PATENT DOCUMENTS 1,556,437 A * 10/1925 Granger ................. B65D 35/28
                                                          222/101
1,793,787 A *  2/1931 Ertola ................... B65D 35/285
                                                          222/102

(Continued)

FOREIGN PATENT DOCUMENTS

WO   2004/009486 A2   1/2001
WO   2004/067386 A2   8/2004

OTHER PUBLICATIONS

International Search Report and the Written Opinion for Application PCT/US2012/058642 dated Jan. 4, 2013.
(Continued)

*Primary Examiner* — Tony G Soohoo
(74) *Attorney, Agent, or Firm* — Sughrue Mion, PLLC

(57) ABSTRACT

An individual frozen drink dispenser includes a housing having a base configured to support a blender cup, a dispensing chamber disposed above the blender cup and configured to support a frozen beverage container containing frozen ingredients suitable for preparing a frozen drink, at least one dispensing mechanism configured to move from a pre-dispense position to a dispense position in which the dispensing mechanism drives the frozen ingredients from the frozen beverage container into the blender cup, and a drive mechanism coupled to the housing and configured to drive the movement of the dispensing mechanism from the pre-dispense position to the dispense position. A method of preparing a frozen drink is further disclosed.

15 Claims, 26 Drawing Sheets

Related U.S. Application Data which is a continuation-in-part of application No. 14/349,413, filed as application No. PCT/US2012/058642 on Oct. 4, 2012, now Pat. No. 9,668,609.

(60) Provisional application No. 61/543,588, filed on Oct. 5, 2011.

(51) Int. Cl.

| | | |
|---|---|---|
| *A23G 9/12* | (2006.01) | |
| *A23G 9/22* | (2006.01) | |
| *B67D 1/00* | (2006.01) | |
| *B67D 1/08* | (2006.01) | |
| *B01F 3/20* | (2006.01) | |
| *A47J 31/40* | (2006.01) | |
| *A47J 43/07* | (2006.01) | |
| *A23G 9/04* | (2006.01) | |
| *B01F 7/16* | (2006.01) | |
| *B01F 15/02* | (2006.01) | |

(52) U.S. Cl.
CPC ............ *A47J 31/407* (2013.01); *A47J 43/046* (2013.01); *A47J 43/0716* (2013.01); *B01F 3/2078* (2013.01); *B01F 7/161* (2013.01); *B01F 7/162* (2013.01); *B01F 15/0206* (2013.01); *B01F 15/0237* (2013.01); *B01F 15/0256* (2013.01); *B67D 1/0001* (2013.01); *B67D 1/0021* (2013.01); *B67D 1/0894* (2013.01); *B67D 1/0895* (2013.01)

(58) Field of Classification Search
CPC .............. A47J 43/0716; B01F 15/0206; B01F 15/0237; B01F 15/0256; B01F 3/2078; B01F 7/161; B01F 7/162; B67D 1/0001; B67D 1/0021; B67D 1/0894; B67D 1/0895
See application file for complete search history.

(56) References Cited

U.S. PATENT DOCUMENTS

| | | | | |
|---|---|---|---|---|
| 1,841,275 A | * | 1/1932 | Baptiste | B65D 35/285 141/362 |
| 1,861,528 A | * | 6/1932 | Hadden | B65D 35/28 222/101 |
| 3,156,103 A | * | 11/1964 | Ross | B67D 3/0009 62/330 |
| 3,209,676 A | | 10/1965 | Zimmermann et al. | |
| 3,213,777 A | | 10/1965 | Heier | |
| 3,295,998 A | | 1/1967 | Goros | |
| 3,384,004 A | | 5/1968 | Perlman et al. | |
| 3,460,717 A | * | 8/1969 | Thomas | A23G 9/282 222/129.1 |
| 3,647,472 A | | 3/1972 | Speech et al. | |
| 3,812,273 A | | 5/1974 | Schmidt | |
| 3,888,859 A | | 6/1975 | Ponzoni et al. | |
| 3,934,759 A | * | 1/1976 | Giannella | A47J 31/401 222/129.1 |
| 3,939,667 A | | 2/1976 | Halverson | |
| 3,987,715 A | * | 10/1976 | Muller | A47J 31/00 99/275 |
| 4,163,510 A | | 8/1979 | Strenger | |
| 4,213,543 A | * | 7/1980 | Thiem | B65D 35/28 222/103 |
| 4,237,911 A | | 12/1980 | White | |
| 4,389,925 A | * | 6/1983 | Piana | A47J 31/0668 99/289 R |
| 4,467,943 A | | 8/1984 | Carse | |
| 4,528,824 A | | 7/1985 | Herbert | |
| 4,681,030 A | * | 7/1987 | Herbert | A23G 9/045 366/144 |
| 4,688,478 A | | 8/1987 | Williams | |
| 4,745,773 A | | 5/1988 | Ando | |
| 4,750,844 A | * | 6/1988 | Stevenett | B01F 15/00025 134/198 |
| 4,867,052 A | * | 9/1989 | Cipelletti | A23G 9/30 99/451 |
| 4,907,723 A | * | 3/1990 | Katz | B67D 3/00 222/105 |
| D310,932 S | | 10/1990 | Mitsubayashi | |
| 5,048,724 A | * | 9/1991 | Thomas | A23G 3/28 222/105 |
| 5,242,083 A | * | 9/1993 | Christine | A47K 5/122 222/105 |
| 5,305,923 A | | 4/1994 | Kirschner | |
| 5,323,691 A | * | 6/1994 | Reese | A23G 9/045 99/275 |
| 5,349,825 A | * | 9/1994 | Duke | A23G 9/20 417/477.9 |
| 5,405,054 A | * | 4/1995 | Thomas | A23G 3/28 222/105 |
| 5,421,484 A | * | 6/1995 | Beach | A23G 9/28 222/105 |
| 5,619,901 A | * | 4/1997 | Reese | A23G 9/045 222/132 |
| 5,653,157 A | * | 8/1997 | Miller | B01F 15/00032 222/129.1 |
| 5,766,665 A | * | 6/1998 | Miller | A23G 9/045 222/144.5 |
| 5,778,761 A | * | 7/1998 | Miller | B01F 15/00032 222/129.1 |
| 5,833,120 A | * | 11/1998 | Evans, Sr. | B67D 7/0216 222/95 |
| 5,948,461 A | * | 9/1999 | Miller | A23G 9/045 222/144.5 |
| 6,003,733 A | * | 12/1999 | Wheeler | B67D 1/0004 222/146.5 |
| 6,182,862 B1 | | 2/2001 | McGill | |
| 6,194,013 B1 | * | 2/2001 | Kolar | A23G 9/045 222/77 |
| 6,196,420 B1 | * | 3/2001 | Gutierrez | B67D 1/0001 222/101 |
| 6,234,071 B1 | * | 5/2001 | Catarain Arregui | A23N 1/003 99/501 |
| 6,264,066 B1 | * | 7/2001 | Vincent | A23G 9/228 222/105 |
| 6,342,260 B2 | | 1/2002 | Kolar | |
| 6,474,862 B2 | | 11/2002 | Farrell | |
| 6,772,675 B2 | * | 8/2004 | Ervin | A23G 9/045 241/101.2 |
| 6,938,801 B1 | * | 9/2005 | Reddy | B67D 1/0007 222/132 |
| 7,231,142 B1 | | 6/2007 | Leung et al. | |
| 7,972,056 B2 | * | 7/2011 | Lontoc | B01F 7/161 366/150.1 |
| 8,291,812 B2 | | 10/2012 | Rivera | |
| 8,685,477 B2 | | 4/2014 | Almblad et al. | |
| 8,721,162 B2 | * | 5/2014 | Claesson | B67D 1/0021 222/129 |
| 8,807,823 B2 | | 8/2014 | Williams | |
| 8,960,999 B1 | | 2/2015 | Ochoa | |
| 9,717,264 B2 | * | 8/2017 | Herbert | A23G 9/12 |
| 2002/0044997 A1 | | 4/2002 | Farrell | |
| 2002/0048626 A1 | | 4/2002 | Miller et al. | |
| 2003/0090958 A1 | * | 5/2003 | Miller | A23G 9/225 366/194 |
| 2005/0170054 A1 | | 8/2005 | Czark et al. | |
| 2008/0282772 A1 | | 11/2008 | Edmonds et al. | |
| 2009/0186141 A1 | | 7/2009 | Almblad et al. | |
| 2011/0068120 A1 | * | 3/2011 | McGill | A23G 9/28 222/1 |
| 2013/0064034 A1 | | 3/2013 | Almblad et al. | |
| 2014/0291426 A1 | | 10/2014 | Herbert | |
| 2015/0071025 A1 | | 3/2015 | Herbert | |
| 2015/0296860 A1 | | 10/2015 | Desjardin | |
| 2015/0374025 A1 | | 12/2015 | Evans | |

(56) References Cited

U.S. PATENT DOCUMENTS

2016/0095461 A1 4/2016 Desjardin
2017/0280745 A1* 10/2017 Herbert .................... A23G 9/28

OTHER PUBLICATIONS

International Preliminary Report on Patentability for Application No. PCT/US2012/058642 dated Apr. 17, 2014.

* cited by examiner

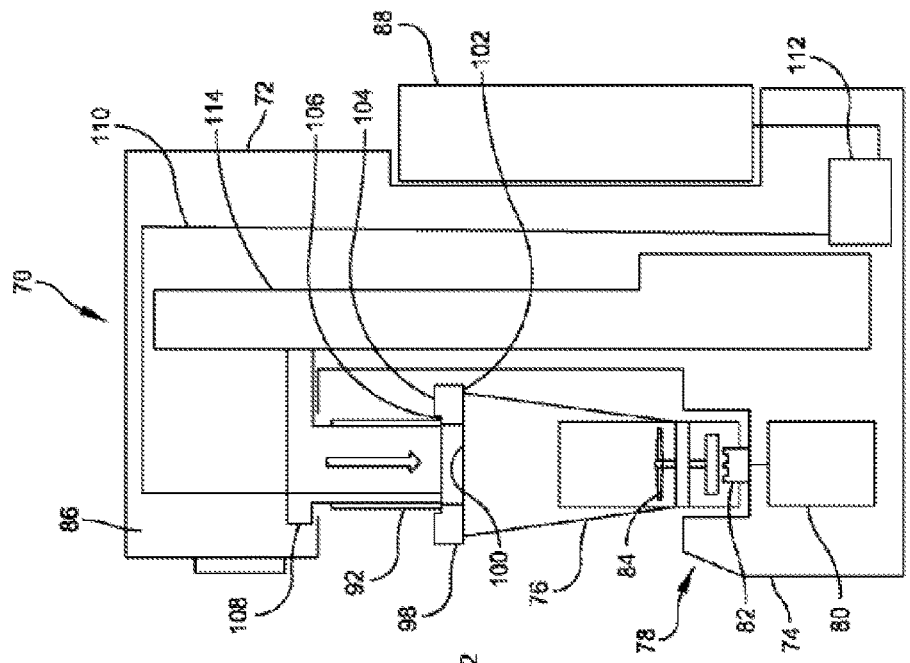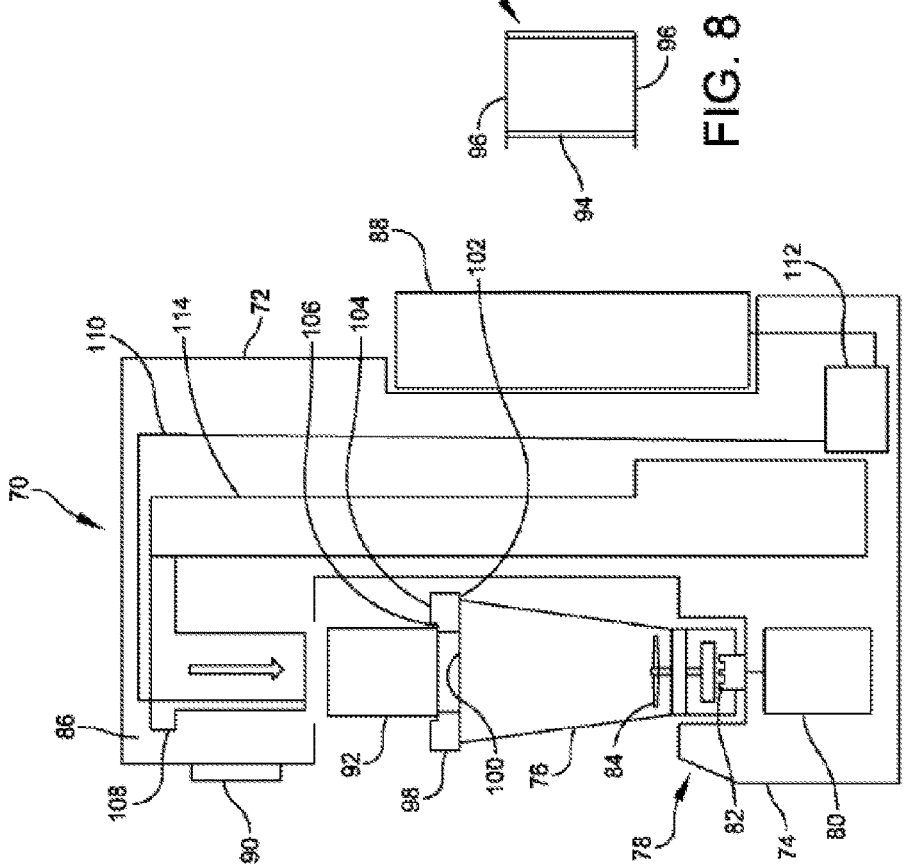

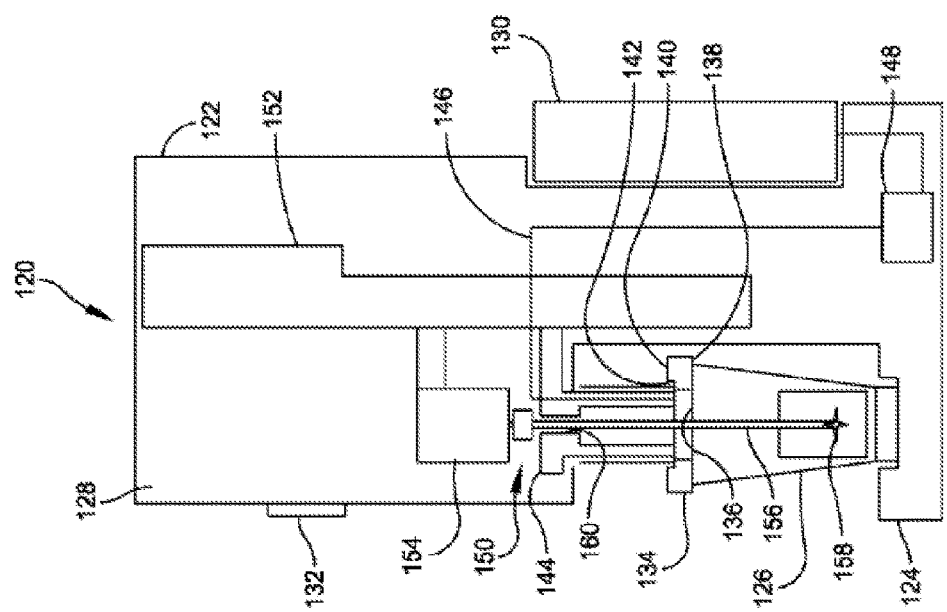
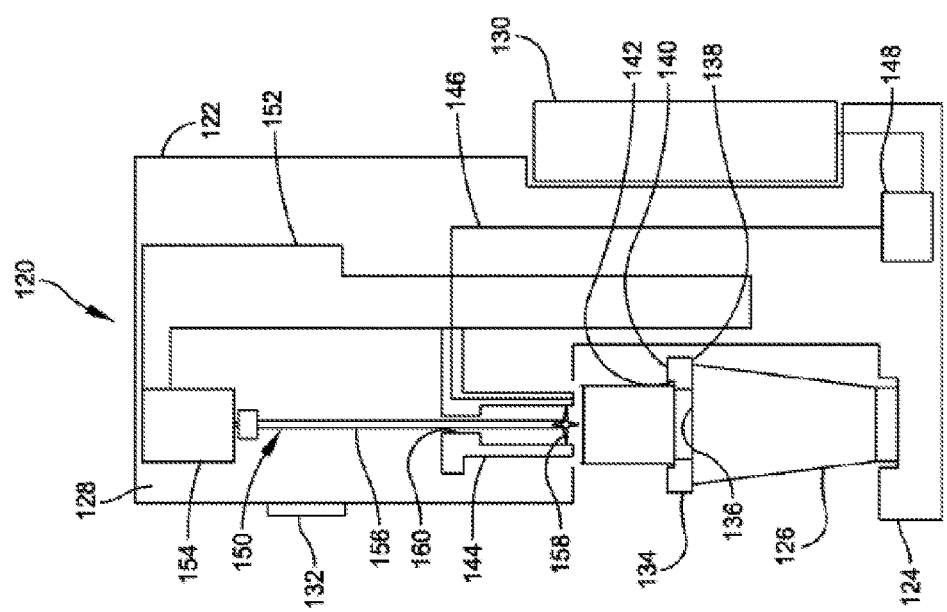

INDIVIDUAL FROZEN DRINK DISPENSER

RELATED APPLICATIONS

This patent application is a continuation-in-part of U.S. patent application Ser. No. 14/541,909, filed Nov. 14, 2014, entitled INDIVIDUAL FROZEN DRINK DISPENSER, which is currently pending and claims priority to U.S. patent application Ser. No. 14/349,413, filed Apr. 3, 2014, entitled INDIVIDUAL FROZEN DRINK DISPENSER, now U.S. Pat. No. 9,668,609 and claims priority to PCT Application No. PCT/US2012/058642, filed Oct. 4, 2012, entitled INDIVIDUAL FROZEN DRINK DISPENSER [now Expired], which claims priority to U.S. Provisional Patent Application Ser. No. 61/543,588, entitled INDIVIDUAL FROZEN DRINK DISPENSER, filed on Oct. 5, 2011, all of which are incorporated herein by reference in their entireties and for all purposes.

BACKGROUND

1. Field

This present disclosure relates generally to beverage dispensers, and more particularly to a single serve frozen drink beverage dispenser capable of preparing a frozen beverage using a disposable cartridge, package, pouch or pod, generically or alternatively referred to as a container, containing frozen ingredients.

2. Description of the Prior Art

Single serve drink dispensers are known in the art for dispensing hot drinks, such as coffee and tea, and for dispensing cold drinks, such as carbonated beverages. However such dispensers are incapable of dispensing blended ice, frozen drinks, such as smoothies and the like.

There exists a need, therefore, for a dispenser that is designed to dispense frozen treats that has a relatively simple and inexpensive operating mechanism, with the capability of presenting a compartment such as a receptacle that is configured to receive a frozen container containing the ingredients for the frozen treat, all within a sanitized environment.

SUMMARY

One aspect of the present disclosure is directed to an individual frozen drink dispenser including: a housing having a base configured to support a blender cup; a container support disposed above the blender cup and configured to support a container having frozen ingredients suitable for preparing a frozen drink; a heater configured to provide heat to the frozen ingredients in the container; a dispense mechanism coupled to the housing and configured to move from a pre-dispense position to a dispense position, wherein the dispense mechanism displaces the frozen ingredients from the container into the blender cup; and a drive mechanism coupled to the housing and configured to rotate a plurality of rotatable blades to blend the frozen ingredients in the blender cup.

In accordance with the above-described aspect of the present disclosure, the individual frozen drink dispenser may further include a water reservoir provided within the housing and a water line in fluid communication with the water reservoir and an opening of the blender cup.

In accordance with the above-described aspect of the present disclosure, the individual frozen drink dispenser may further include a blender assembly configured to blend ingredients within the blender cup.

In accordance with the above-described aspect of the present disclosure, the blender assembly may include a motor disposed within the base, wherein the motor is configured to power the drive mechanism.

In accordance with the above-described aspect of the present disclosure, the package support may be configured to rest on the blender cup.

In accordance with the above-described aspect of the present disclosure, the heater may be sized and shaped such that an interior surface of the heater substantially corresponds to a size and shape of a corresponding exterior surface of the container containing the frozen ingredients.

In accordance with the above-described aspect of the present disclosure, the package heater may include one or more heating elements located about at least a portion of a circumference of the heater.

In accordance with the above-described aspect of the present disclosure, the heater may be attached to the container support.

In accordance with the above-described aspect of the present disclosure, the heater may be attached to the dispense mechanism.

In accordance with the above-described aspect of the present disclosure, the individual frozen drink dispenser may further include a controller coupled to the drive mechanism and package heater and configured to control the operation of the individual frozen drink dispenser.

Another aspect of the present disclosure is directed to a method of dispensing a frozen drink, the method including: placing a blender cup on a base of an individual frozen drink dispenser; placing a container containing frozen ingredients for preparing a frozen drink above the blender cup; providing heat to the container; displacing the frozen ingredients from the container to the package into the blender cup; and blending the frozen ingredients in the blender cup, wherein blending the frozen ingredients is achieved by using a plurality of rotatable blades.

In accordance with the above-described aspect of the present disclosure, the method may further include injecting fluid from a water reservoir into the blender cup.

In accordance with the above-described aspect of the present disclosure, displacing the ingredients from the container into the blender cup may be achieved by a dispense mechanism that mechanically presses the ingredients downwards.

In accordance with the above-described aspect of the present disclosure, the heater may be attached to a container support disposed above the blender cup.

In accordance with the above-described aspect of the present disclosure, the heater may be attached to the dispense mechanism.

Another aspect of the present disclosure is directed to an individual frozen drink dispenser including: a blender drive configured to drive operation of blades within a mixing cup; a dispensing chamber configured to receive a frozen beverage cartridge containing frozen edible ingredients, the dispensing chamber may include a dispensing roller configured to bear against a side of the frozen beverage container along a length of the frozen beverage container in order to squeeze the contents from the frozen beverage container into the mixing cup for making a frozen drink; and a controller coupled to the blender drive, the at least one dispensing roller, and a water pump to control the operation of the individual frozen drink dispenser.

In accordance with the above-described aspect of the present disclosure, the dispensing roller may be movable relative to the frozen beverage container from a pre-dispense position (e.g., an upper position) to a dispense (e.g., a lower position) along the length of the frozen beverage container.

In accordance with the above-described aspect of the present disclosure, the frozen beverage container may be movable relative to the at least one dispensing roller from a pre-dispense position to a dispense position along the length of the frozen beverage container.

In accordance with the above-described aspect of the present disclosure, a side of the frozen beverage container may be flexible.

In accordance with the above-described aspect of the present disclosure, the dispensing chamber may further include a cover or door configured to be opened and closed.

In accordance with the above-described aspect of the present disclosure, the frozen beverage container may be formed by an impermeable pouch and a seal tab projecting from an end of the impermeable pouch. Further, the seal tab may be secured to the impermeable pouch along a tear line.

In accordance with the above-described aspect of the present disclosure, the dispensing chamber may further include an auto-tear mechanism configured to automatically open the frozen beverage cartridge at one end. The auto-tear mechanism may include a movable holding arm configured to secure the frozen beverage container and a movable tearing arm configured to grasp and tear open the frozen beverage container.

In accordance with the above-described aspect of the present disclosure, the frozen beverage container may be formed by an impermeable pouch and a seal tab projecting from an end of the impermeable pouch. Further, the seal tab may include an opening configured to receive a tip of the movable tearing arm.

In accordance with the above-described aspect of the present disclosure, the frozen beverage container may include a frangible or breakable seal.

In accordance with the above-described aspect of the present disclosure, the dispensing chamber may further include a discharge passage through which a depleted frozen beverage cartridge is discharged.

Another aspect of the present disclosure is directed to method of dispensing a frozen drink, the method comprising: providing an individual frozen drink dispenser including a blender drive configured to drive operation of blades within a mixing cup, a dispensing chamber configured to receive a frozen beverage container including frozen edible ingredients, the dispensing chamber including a dispensing roller, and a controller coupled to the blender drive, the dispensing roller, and a water pump to control the operation of the individual frozen drink dispenser; inserting the frozen beverage container into the dispensing chamber; squeezing the contents of the frozen beverage container from the frozen beverage cartridge into the mixing cup by moving the frozen beverage container or the dispensing roller relative to the other along a length of the frozen beverage container while the dispensing roller bears against a side of the frozen beverage container; and blending the contents of the frozen beverage container in the mixing cup with the blades.

In accordance with the above-described aspect of the present disclosure, the step of squeezing the contents of the frozen beverage container into the mixing cup may include moving the dispensing roller relative to the frozen beverage container from a pre-dispense position to a dispense position along the length of the frozen beverage container.

In accordance with the above-described aspect of the present disclosure, the step of squeezing the contents of the frozen beverage container from the frozen beverage cartridge into the mixing cup may include moving the frozen beverage container relative to the dispensing roller from a pre-dispense position to a dispense position along the length of the frozen beverage container.

In accordance with the above-described aspect of the present disclosure, the method may further include discharging a depleted frozen beverage container.

These and other features and advantages of the present disclosure will now be described in greater detail with reference to the accompanying drawings, detailed description and claims.

BRIEF DESCRIPTION OF THE DRAWINGS

FIG. 7 is a schematic view of an individual frozen drink dispenser of another embodiment of the present disclosure in a pre-dispense position;

FIG. 8 is a schematic view of a frozen pod or cartridge that is used with the individual frozen drink dispenser shown in FIG. 7;

FIG. 9 is a schematic view of the individual frozen drink dispenser of FIG. 7 in a dispense position;

FIG. 10 is a schematic view of an individual frozen drink dispenser of yet another embodiment of the present disclosure in a pre-dispense position; and FIG. 11 is a schematic view of the individual frozen drink dispenser of FIG. 10 in a dispense position.

DETAILED DESCRIPTION OF EMBODIMENTS

Figure 1:
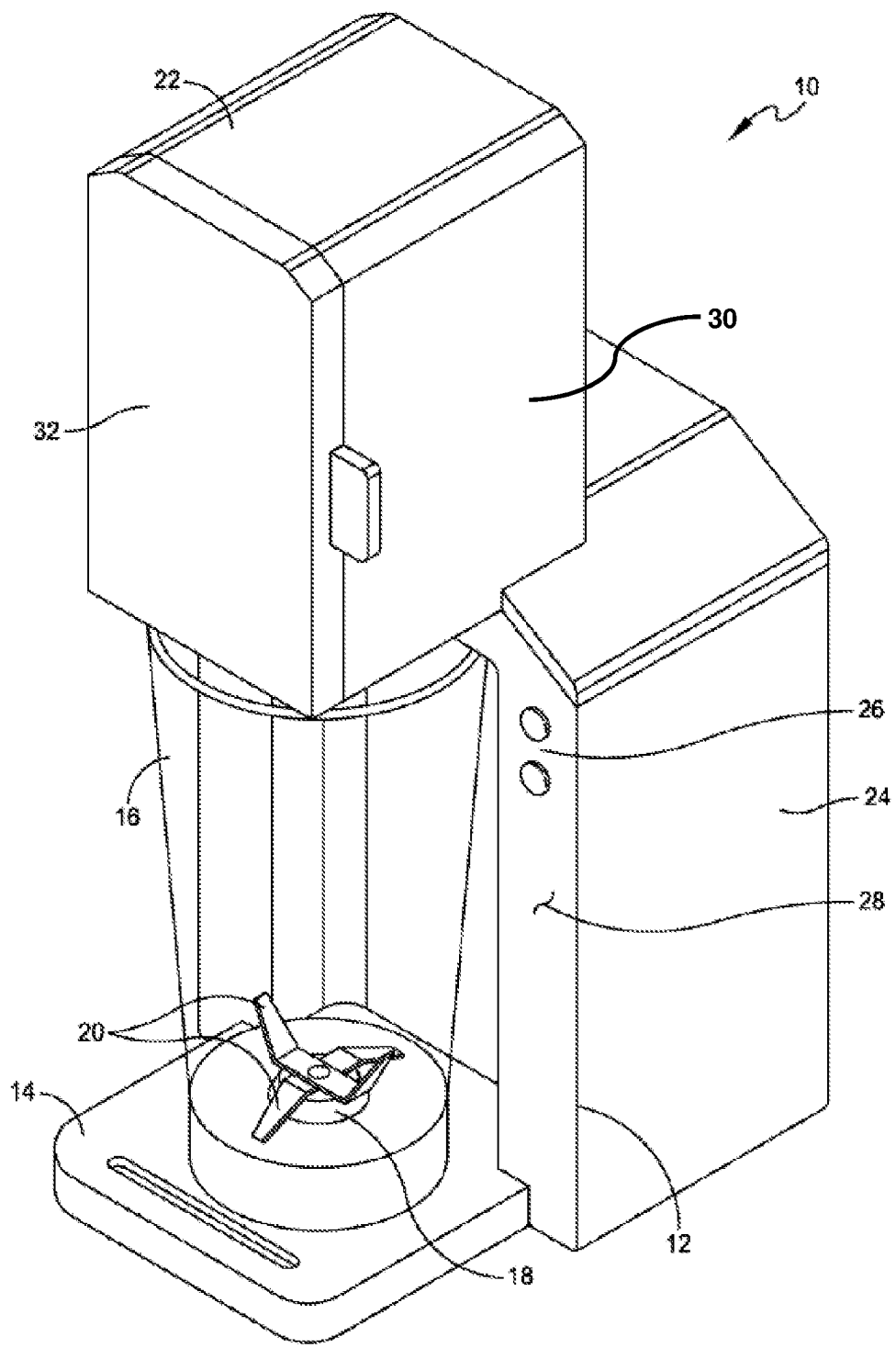
FIG. 1 is a perspective view of an individual frozen drink dispenser of an embodiment of the present disclosure.

For the purposes of illustration only, and not to limit the generality, embodiments of the present disclosure will now be described in detail with reference to the accompanying figures. The present disclosure is not limited in its application to the details of construction and the arrangement of components set forth in the following description or illustrated in the drawings. The present disclosure is capable of other embodiments and of being practiced or being carried out in various ways. Also the phraseology and terminology used herein is for the purpose of description and should not be regarded as limiting. The use of "including," "comprising," "having," "containing" "involving," and variations thereof herein, is meant to encompass the items listed thereafter and equivalents thereof as well as additional items.

Referring to the drawings, and more particularly to FIG. 1, there is generally indicated at 10 a single serve or individual frozen drink dispenser. The dispenser 10 includes a housing 12 with a forwardly protruding bottom shelf 14 arranged to support a blender cup 16 for the dispensed frozen beverage. A blender drive 18 is provided on the bottom shelf 14 to drive the operation of blades 20 provided in the blender cup 16. The housing 12 further includes a dispensing chamber 22 positioned above the bottom shelf 14. The housing 12 further includes a water reservoir 24 positioned at the rear of the housing and an electronic control panel 26 provided on a front surface 28 of the housing to control the operation of the dispenser 10.

Figure 2:
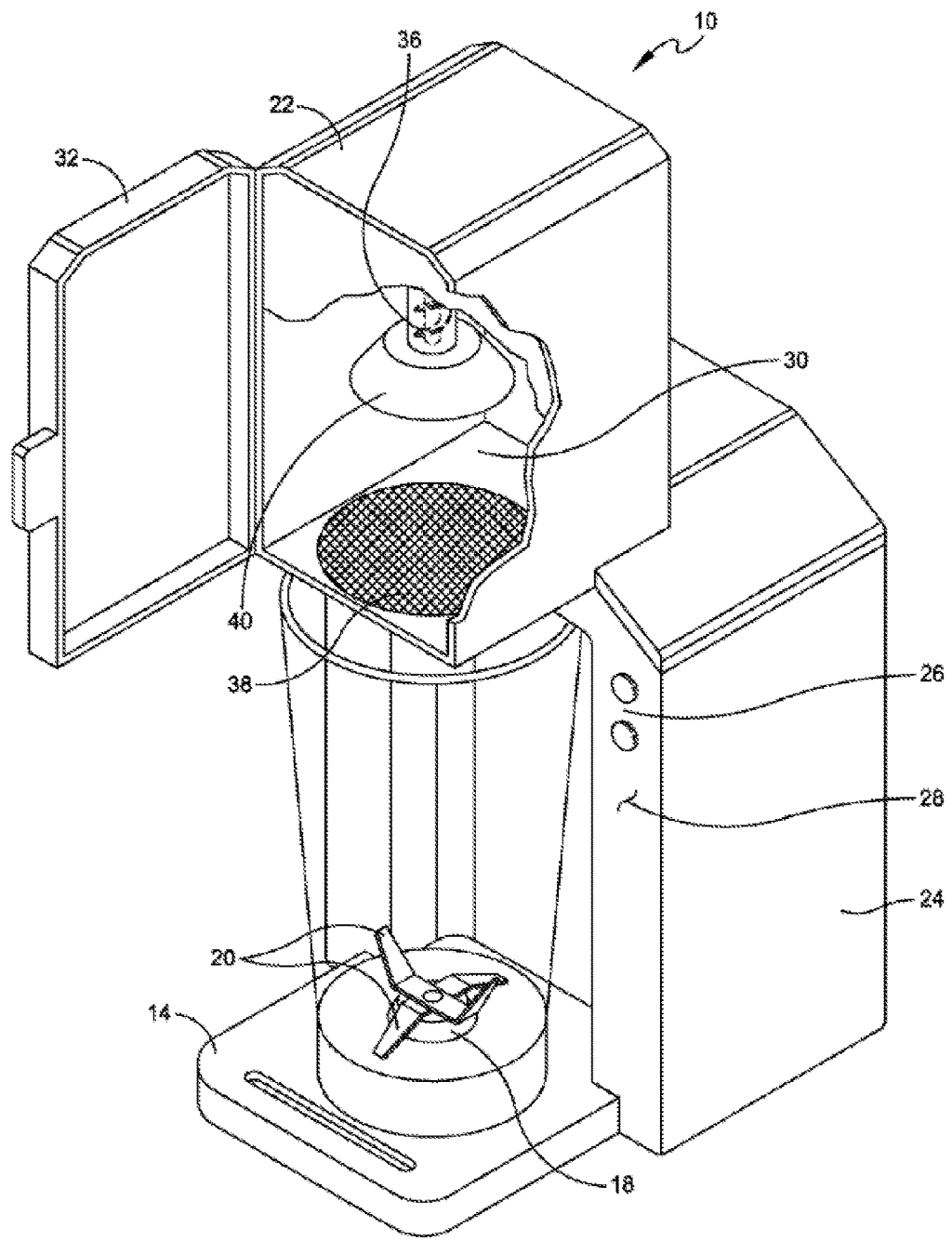
FIG. 2 is a perspective view of the frozen drink dispenser shown in FIG. 1 with a door of a dispensing chamber shown in an open position and part of the dispensing chamber removed to reveal a cartridge receptacle.

Referring to FIG. 2, the dispensing chamber 22 includes a receptacle 30, and a door 32 that provides access to the receptacle. The receptacle 30 is configured and dimensioned to receive a disposable, frozen beverage container 34 (not shown in FIG. 2), which can be a cartridge, pod, or package. A frozen beverage container 34 will be shown and described with reference to FIGS. 3-5. The dispensing chamber 22 further includes a dispense plunger 36 that is controlled by the electronic control panel 26. The dispense plunger 36 drives the downward movement of ingredients contained within the frozen beverage container 34, optionally through a mesh or serrated disc 38 to separate the frozen ingredients being pushed through the disc. The mesh disc 38 may be fabricated from stainless steel material, or any other suitable material, that is capable of separating the frozen material. In an alternative embodiment, the serrated disc could be embedded within a serrated platform under the product to allow more efficient and timely blending.

In some embodiments, the frozen beverage container 34 includes an impermeable container fabricated from cardboard or plastic material to contain frozen edible ingredients. In one embodiment, the frozen beverage container 34 is cylindrical in shape. However, other suitable shapes can be adopted that correspond to the shape of the dispense plunger 36. The frozen beverage container 34 contains ingredients in liquid or non-frozen condition that are placed in a freezer for cooling. As used herein, the container may take any suitable form depending on the size and form factor of the dispenser 10. The frozen beverage container 34 may be impervious to air and/or liquid. The frozen beverage container 34 may include edible frozen ingredients, such as fruit, milk, a drink mix, and/or any other suitable ingredient for creating a frozen beverage, such as a smoothie or the like. In preparing a frozen drink, such as a smoothie, the process of preparing a beverage may include infusion, mixing, dissolving or otherwise forming a drinkable substance using water or other beverage precursor (e.g., flavored or otherwise treated water, or other liquid) with the edible ingredient contained within the frozen beverage cartridge. Also, reference to "water" herein is to any suitable water formulation, e.g., filtered, de-ionized, softened, etc., as well as any other suitable precursor liquid used to form a frozen beverage, such as sweetened or flavored water, milk, etc.

Figure 3:
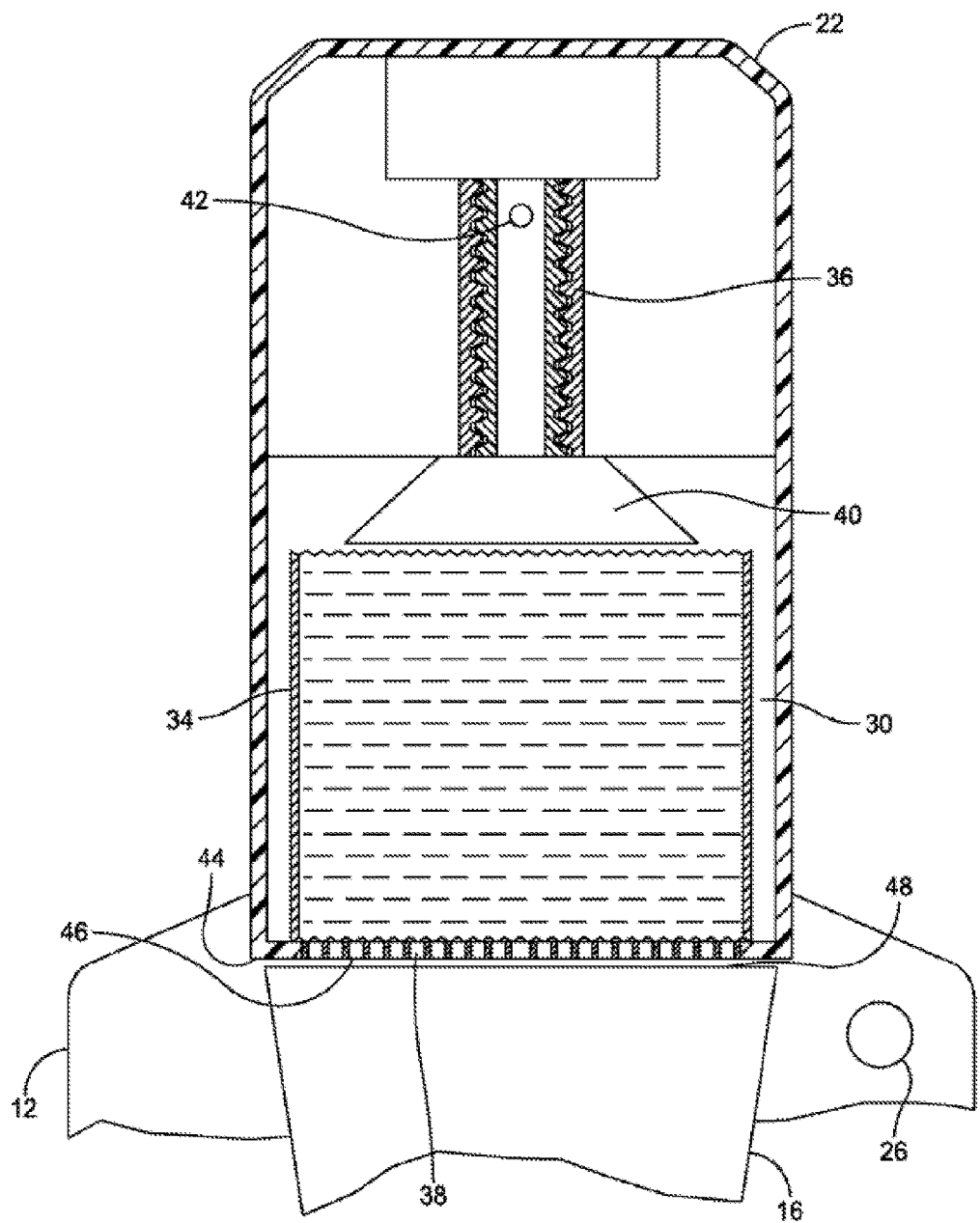
FIG. 3 is a cross-sectional view of the dispensing chamber of the frozen drink dispenser with a dispense plunger of the dispensing chamber being shown in a pre-dispense or upper position.
Figure 4:
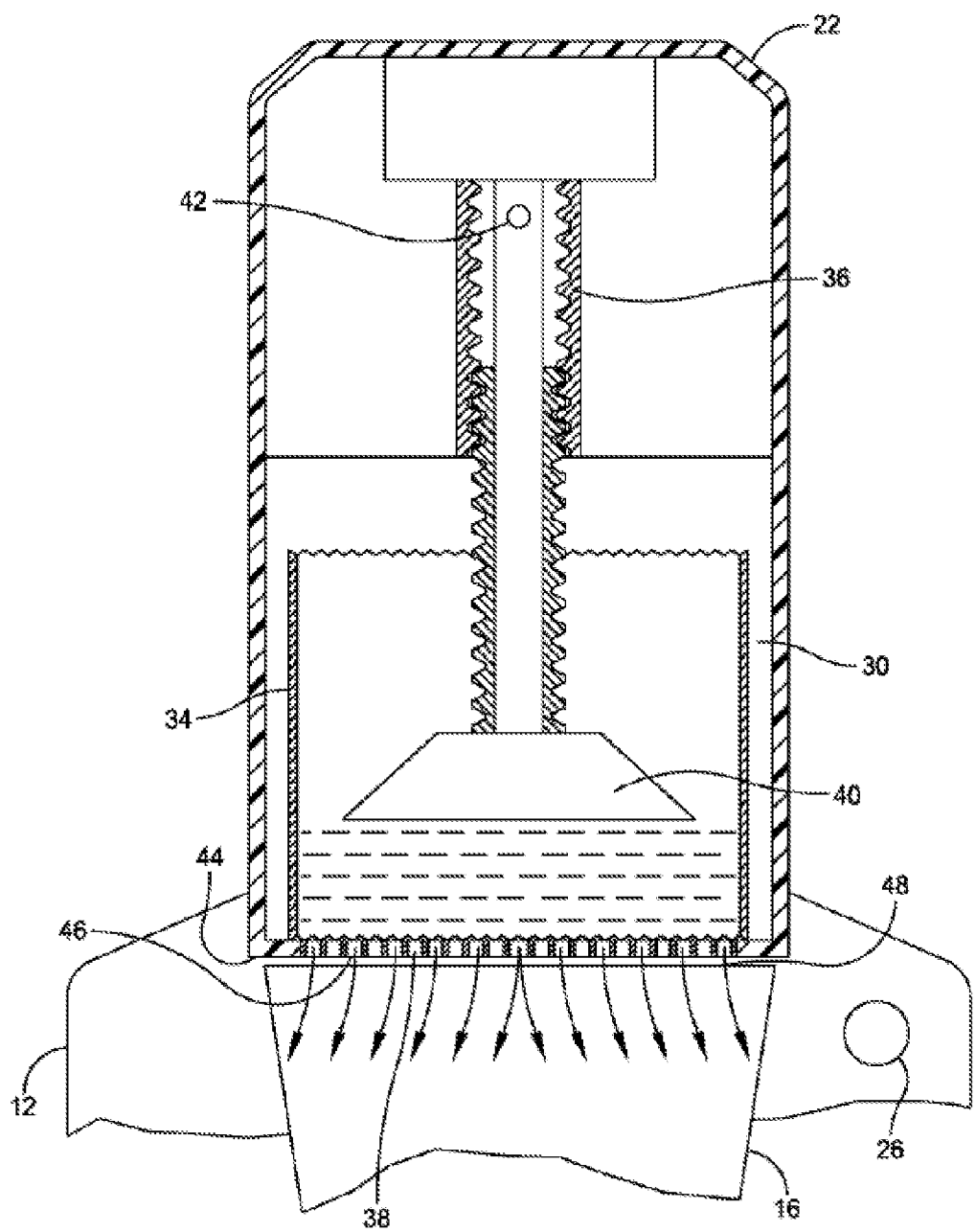
FIG. 4 is a cross-sectional view of the dispensing chamber of the frozen drink dispenser with the dispense plunger being shown in a dispense or lower position.
Figure 5:
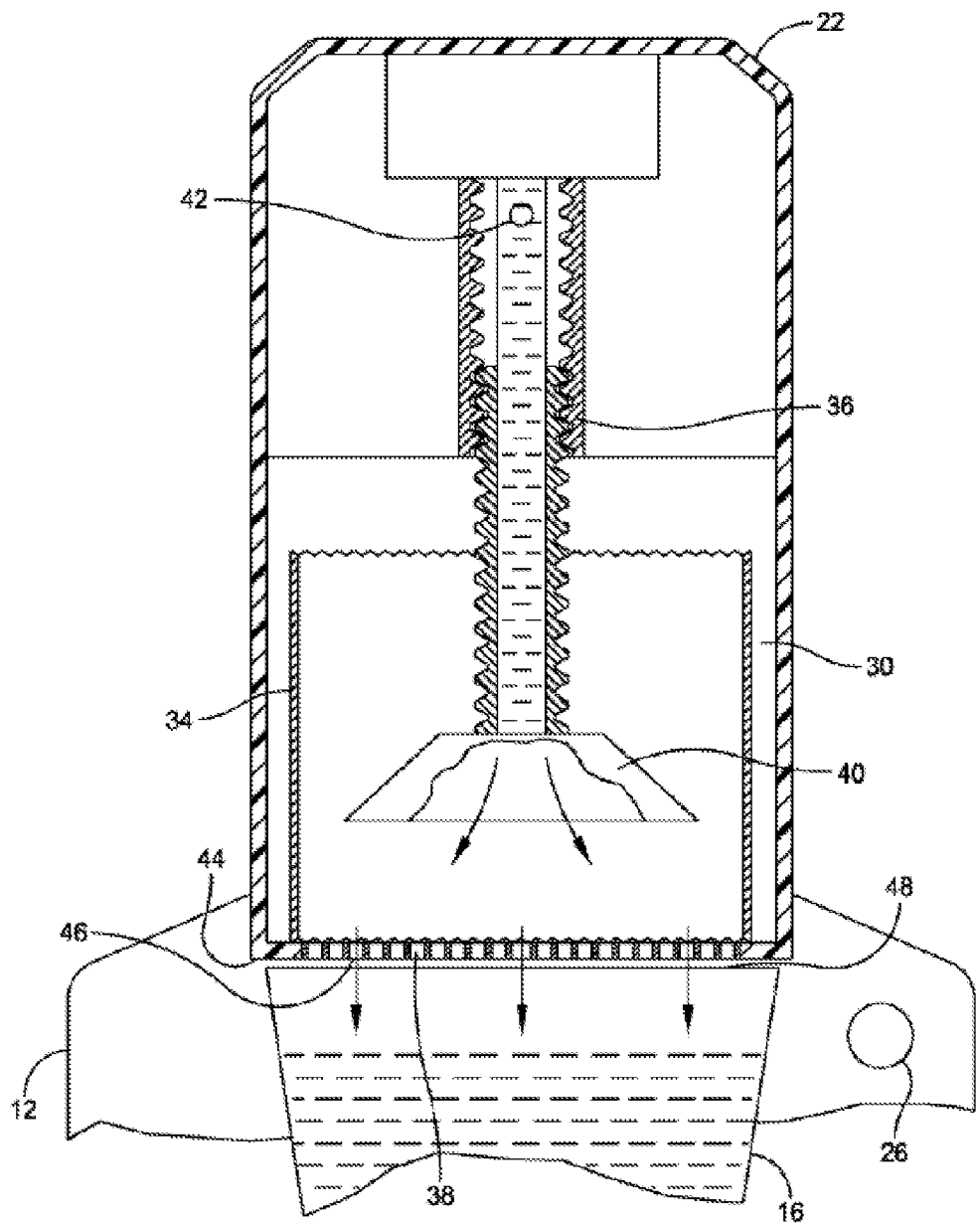
FIG. 5 is a cross-sectional view similar to FIG. 4 showing a fluid (e.g., water) being dispensed through the dispense plunger.

Referring to FIGS. 3-5, the dispensing chamber 22, in addition to the dispense plunger 36, includes a cover 40 that is disposed over the dispense plunger to prevent the ingredients from exiting up through the frozen beverage cartridge 34 as the dispense plunger moves downward through the frozen beverage cartridge. The cover 40 assists in maintaining the receptacle 30 in a sanitized condition while operating the dispense plunger 36. The dispensing chamber 22 may further includes a water inlet 42 for introducing measured pumped water into the dispense plunger 36 from the water reservoir 24. Thus, the water is introduced into the blender cup 16 via the dispense plunger 36. The water is used to prepare the frozen beverage and to rinse the dispense plunger 36 and the disc 38.

Referring to FIG. 3, the dispense plunger 36 is shown in a pre-dispense or upper position. In this position, the frozen beverage container 34 may be inserted into the receptacle 30 with the dispense plunger and the cover 40 disposed above the frozen beverage container.

Referring to FIG. 4, the dispense plunger 36 is shown in a dispense or substantially lower position. In this position, the dispense plunger 36 is moved into the frozen beverage container 34 to push the ingredients contained within the frozen beverage container through the disc 38 and into the blender cup 16.

Referring to FIG. 5, the dispense plunger 36 is further shown in the dispense position with water or another suitable fluid being dispensed through the dispense plunger from the water inlet 42 through the disc 38 and into the blender cup 16. Once the blender cup 16 is filled with the edible ingredients and water, the blender drive 18 is operated to rotate the blades 20 provided in the blender cup. This operation mixes the ingredients within the blender cup 16 to create the finished drink, e.g., the smoothie. As shown, a bottom edge 44 of the dispensing chamber 22 and a bottom surface 46 of the disc 38 are closely proximate to a top edge 48 of the blender cup 16 to prevent the ingredients and water from splashing out of the blender cup.

Figure 6:
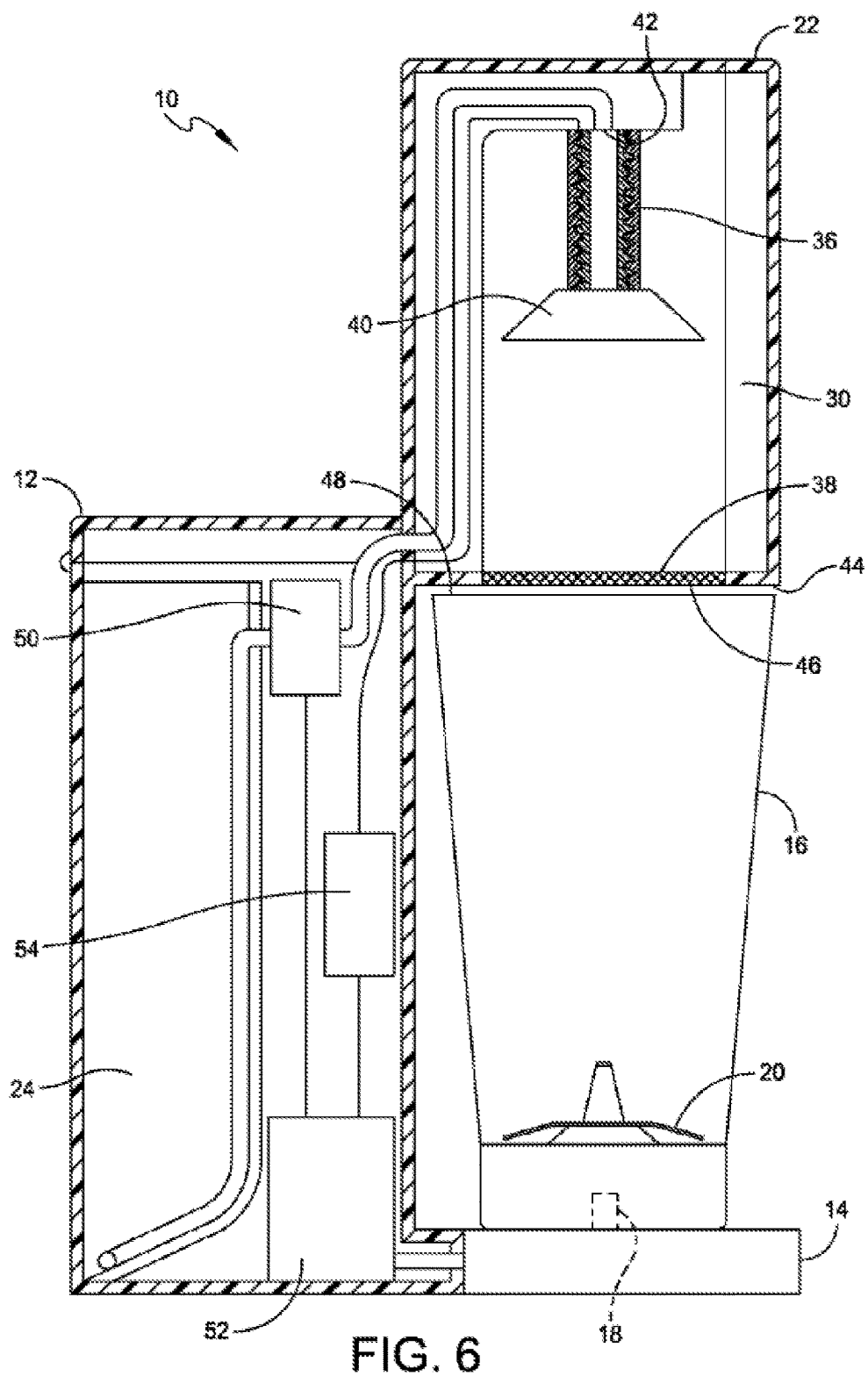
FIG. 6 is a cross-sectional side view of the frozen drink dispenser in accordance with an embodiment of the present invention.

FIG. 6 illustrates other components of the dispenser 10. As shown, the water reservoir 24 is connected to a water pump 50, which drives the movement of the water from the water reservoir to the dispense plunger 36. The dispenser 10 further includes an electronic control box or controller 52 that is coupled to the water pump 50, the blender drive 18, and to the electronic control panel 26. The electronic control box 52 is further coupled to a drive motor 54 to drive the up-and-down movement of the dispense plunger 36, and to the blender drive 18 to rotate the blades 20 of the blender cup. The electronic control box 52, via the electronic control panel 26, controls the operation of these component parts of the dispenser 10.

In light of the foregoing, it will now be understood that the dispenser 10 of the present disclosure is capable of preparing an individual frozen drink from a disposable frozen beverage container 34 containing the necessary ingredients for preparing the frozen drink. In operation, the door 32 of the dispensing chamber 22 is opened and a new frozen container 34 is inserted into the receptacle 30. Once inserted, the door 32 is closed and the dispense plunger 36 is driven downwardly to expel the frozen ingredients from the frozen beverage container 34 through the disc 38 and into the blender cup 16. Once fully expelled, a pre-measured amount of water is delivered to the blender cup 16 from the water reservoir 24 by operating the water pump 50. This part of the process also rinses the dispense plunger 36 and the disc 38 so as to maintain a clean environment. Once the frozen ingredients and the water are disposed in the blender cup 16, the blender drive 18 is operated to rotate the blades 20. This action blends or mixes the frozen ingredients and the water to create the frozen drink that is suitable for consumption. Once the frozen drink is prepared, the door 32 to the dispensing chamber 22 may be opened to remove the depleted container 34. At this point the process of preparing another frozen beverage may begin again.

A method of dispensing a frozen drink can be achieved by using the dispenser 10 of embodiments of the present disclosure. For example, the method may include inserting a frozen beverage container 34 into the receptacle 30 of the individual frozen drink dispenser 10. Next, the contents of the frozen beverage container 34 are pushed through the meshed or serrated disc 38 positioned at a bottom of the receptacle 30. Next, the contents of the frozen beverage cartridge 34 are dispensed from the meshed or serrated disc 38 into the blender cup 16. Next, the contents of the frozen beverage container dispensed in the blender cup 16 are blended with blades 20 provided in the blender cup. Optionally, when pushing the contents of the frozen beverage container 34 through the meshed or serrated disc 38, the method further may include injecting fluid from the water reservoir 24 into the receptacle 30 when pushing contents of the frozen container to add flavor, for example, to the contents being pushed through the meshed or serrated disc.

Referring to FIG. 7, another embodiment of an individual frozen drink dispenser of the present disclosure is generally indicated at 70. As shown, the dispenser 70 includes a housing 72 with a forwardly protruding base 74 configured to support a blender cup 76 for the dispensed frozen beverage. The dispenser 70 further includes a blender assembly generally indicated at 78 having a motor 80 provided within the base 74 to power the operation of a drive mechanism 82 associated with the blender cup 76. As shown, the drive mechanism 82 is coupled to blades 84 provided within the blender cup 76 to chop or otherwise blend the material deposited in the blender cup. The housing 72 further includes an upper chamber 86 positioned above the base 74. The housing 72 further includes a water reservoir 88 positioned at a rear of the housing and an electronic control panel 90 provided on a front surface of the housing to control the operation of the dispenser 70. In one embodiment, the control panel 90 functions as a user interface designed to manipulate a controller, which control the operative components of the dispenser 70.

Referring to FIG. 8, a frozen product container, such as pod or cartridge, is generally indicated at 92. As shown, the pod 92 includes a generally cylindrical packaging tube 94 and two peel-away seals, each indicated at 96, provided at open ends of the tube. The arrangement is such that product for dispensing is disposed within the tube 94 and held in place by the seals 96. During use, the seals 96 are removed by pealing them away from the tube 94, and the pod is utilized to dispense the frozen product contained within the tube of the pod into the blender cup 76. In some embodiments, the tube 94 of the pod 92 includes an impermeable container fabricated from cardboard or plastic material to contain frozen edible ingredients. In other embodiments, the seals 96 of the pod 92 include foil or some other material suitable for containing the product within the tube 94 of the pod and for peeling away from the tube when it is desired to use the pod. Although the tube 94 of the pod 92 is shown to be cylindrical in shape, other suitable shapes may be provided that are tailored to the shapes of devices that are used to move the product out of the tube.

In one embodiment, the pod 92 contains ingredients in liquid or non-frozen condition that are placed in a freezer for cooling. As used herein, a "pod" may take any suitable form depending on the size and form factor of the dispenser 70. The pod 92 may be impervious to air and/or liquid. As with container 34, the pod 92 may include edible frozen ingredients, such as fruit, milk, a drink mix, and/or any other suitable ingredient for creating a frozen beverage, such as a smoothie or the like. In preparing a frozen drink, such as a smoothie, the process of preparing a beverage may include infusion, mixing, dissolving or otherwise forming a drinkable substance using water or other beverage precursor (e.g., flavored or otherwise treated water, or other liquid, such as milk) with the edible ingredient contained within the pod 92.

Referring back to FIG. 7, in one embodiment, a pod support 98 is positioned on a top lip or edge 100 of the blender cup 76. As shown, the pod support 98 includes a lower surface 102 configured to seat the pod support on the edge 100 of the blender cup 76 and an upper surface 104 having a recess 106 formed therein, the recess being sized to receive the pod 92 within the recess after removing the seals 96 from the tube 94 of the pod. In another embodiment, the pod support 98 may be supported by the housing 72 below the chamber 86. The dispenser 70 further includes a dispense plunger 108 within the chamber 86, with the dispense plunger being controlled by an operator via the electronic control panel 90. The dispense plunger 108 drives the downward movement of ingredients contained within the tube 94 of the pod 92 into the blender cup 76. The dispenser 70 further includes a water line 110 for introducing measured pumped water into the dispense plunger 108 from the water reservoir 88. A pump 112 is provided within the housing 72 of the dispenser 70 to move the water from the reservoir 88 through the water line 110. In one embodiment, the pump 112 is also controlled by the controller associated with the electronic control panel 90. The water line 110 is provided to introduce water into the blender cup 76 via the dispense plunger 108. The water is used to prepare the frozen beverage. FIG. 7 illustrates the dispense plunger 108 of the dispenser 70 in a pre-dispense or upper position. In this position, the pod 92 with seals 96 removed from the tube 94 may be placed on the pod support 98 with the dispense plunger 108 disposed above the pod.

FIG. 9 illustrates the dispense plunger 108 of the dispenser 70 in a dispense or lower position. As shown, the dispenser 70 includes a plunger drive mechanism 114 that is coupled to the dispense plunger 108 to drive the up-and-down movement of the dispense plunger within the chamber 86. In one embodiment, the plunger drive mechanism 114 operates under the control of the controller associated with the control panel 90. In the dispense position, the dispense plunger 108 is moved into the tube 94 of the pod 92 to push the ingredients contained within the pod into the blender cup 76. As shown, the dispense plunger 108 is sized to tightly fit within the tube 94 of the pod 92 so that when moving the dispense plunger downwardly with the plunger drive mechanism 114, the dispense plunger moves all or nearly all of the ingredients contained within the pod out of the pod and into the blender cup 76. Once dispensed, the dispense plunger 108 returns to its upper, pre-dispense position. Water is then introduced into the blender cup 76 by operating the pump 112 and the motor 80 drives the rotation of the blades 84 via the drive mechanism 82 to blend the ingredients to prepare the frozen drink.

Once blended, the cycle is complete and the blender cup 76 may be removed from the base 74 of the dispenser 70 and the pod 92 is removed from the pod support 98. Next, the pod support 98 is removed from the upper edge 100 of the blender cup 76 in which the frozen drink contained within the blender cup is ready to drink.

Referring now to FIG. 10, another embodiment of an individual frozen drink dispenser of the present disclosure is generally indicated at 120. As shown, the dispenser 120 includes a housing 122 with a forwardly protruding base 124 configured to support a blender cup 126 for the dispensed frozen beverage. Unlike blender cup 76, the blender cup 126 does not include a drive mechanism or blades incorporated within the blender cup, but instead includes a flat bottom. The housing 122 further includes an upper chamber 128 positioned above the base 124. The housing 122 further includes a water reservoir 130 positioned at the rear of the housing and an electronic control panel 132 provided on a front surface of the housing to control the operation of the dispenser. In one embodiment, the control panel 132 functions as a user interface designed to manipulate a controller associated with the control panel, which controls the operative components of the dispenser 120.

A pod support 134 is positioned on a top lip or edge 136 of the blender cup 126. As shown, the pod support 134 includes a lower surface 138 configured to seat the pod support on the edge 136 of the blender cup 126 and an upper surface 140 having a recess 142 formed therein, the recess being sized to receive the pod 92 within the recess after removing the seals 96 from the tube 94 of the pod. The dispenser 120 further includes a dispense plunger 144 positioned within the chamber 128, the dispense plunger being controlled by an operator via the electronic control panel 132. The dispense plunger 144 drives the downward movement of ingredients contained within the tube 94 of the pod 92 into the blender cup 126. The dispenser 120 further includes a water line 146 for introducing measured pumped water into the dispense plunger 144 from the water reservoir 130. A pump 148 is provided within the housing 122 of the dispenser 120 to move the water from the reservoir 130 through the water line 146. In one embodiment, the pump 148 is also controlled by the controller associated with the electronic control panel 132. As with dispenser 70, the water line 146 of dispenser 120 is provided to introduce water into the blender cup 126 via the dispense plunger 144. FIG. 10 illustrates the dispense plunger 144 of the dispenser 120 in a pre-dispense or upper position. In this position, the pod 92 may be placed on the pod support 134 with the dispense plunger 144 disposed above the pod.

The dispenser 120 further includes a blender assembly generally indicated at 150 mounted on a plunger and blender drive mechanism 152 on which the dispense plunger 144 is also mounted. As shown, the blender assembly 150 includes a motor 154 supported by the plunger and blender drive mechanism 152 at an upper end of the plunger and blender drive mechanism. The blender assembly 150 further includes a rotatable shaft 156 connected to the motor 154 at an upper end of the shaft and blades 158 mounted on the shaft at a lower end of the shaft. The shaft 156 of the blender assembly extends through an opening 160 formed in the dispense plunger 144, with the shaft being lowered into the blender cup 126 to chop or otherwise blend the ingredients contained within the blender cup.

FIG. 11 illustrates the dispense plunger 144 of the dispenser 120 in a dispense or lower position. As shown, the dispense plunger 144 is coupled to the plunger and blender drive mechanism 152 to drive the up-and-down movement of the dispense plunger as well. In the dispense position, the dispense plunger 144 is moved into the pod 92 to push the ingredients contained within the pod into the blender cup 76. Once dispensed, the dispense plunger 144 returns to its upper, pre-dispense position. Water is then introduced into the blender cup 126 by the water line 146, and the blades 158 of the blender assembly 150 are lowered into the blender cup. The motor 154 drives the rotation of the blades 158 to blend the frozen drink. Once blended, the dispense plunger 144 and the blender assembly 150 are returned to their home or upper position. It should be noted that the movement of the dispense plunger 144 and the blender assembly 150 by the plunger and drive mechanism 152 may occur independently or simultaneously depending on how the mechanism is configured.

When the cycle is complete, the blender cup 126 may be removed from the base of the dispenser 120 and the pod 92 is removed from the pod support 134. Next, the pod support 134 is removed from the upper edge 136 of the blender cup 126 in which the frozen drink contained within the blender cup is ready to drink.

It should be understood that while the plunger drive mechanisms 114, 152 of the dispensers 70, 120 are shown to be automated under the control of the controller associated with control panels 90, 132, respectively, the plunger drive mechanisms can be manually operated by the person operating the dispensers. For example, a lever or some other manually operated device may be associated with the plunger drive mechanism 114, 152 to move the dispense plungers 108, 114 upward and downward to dispense the product contained within the pods 92.

Figure 12:
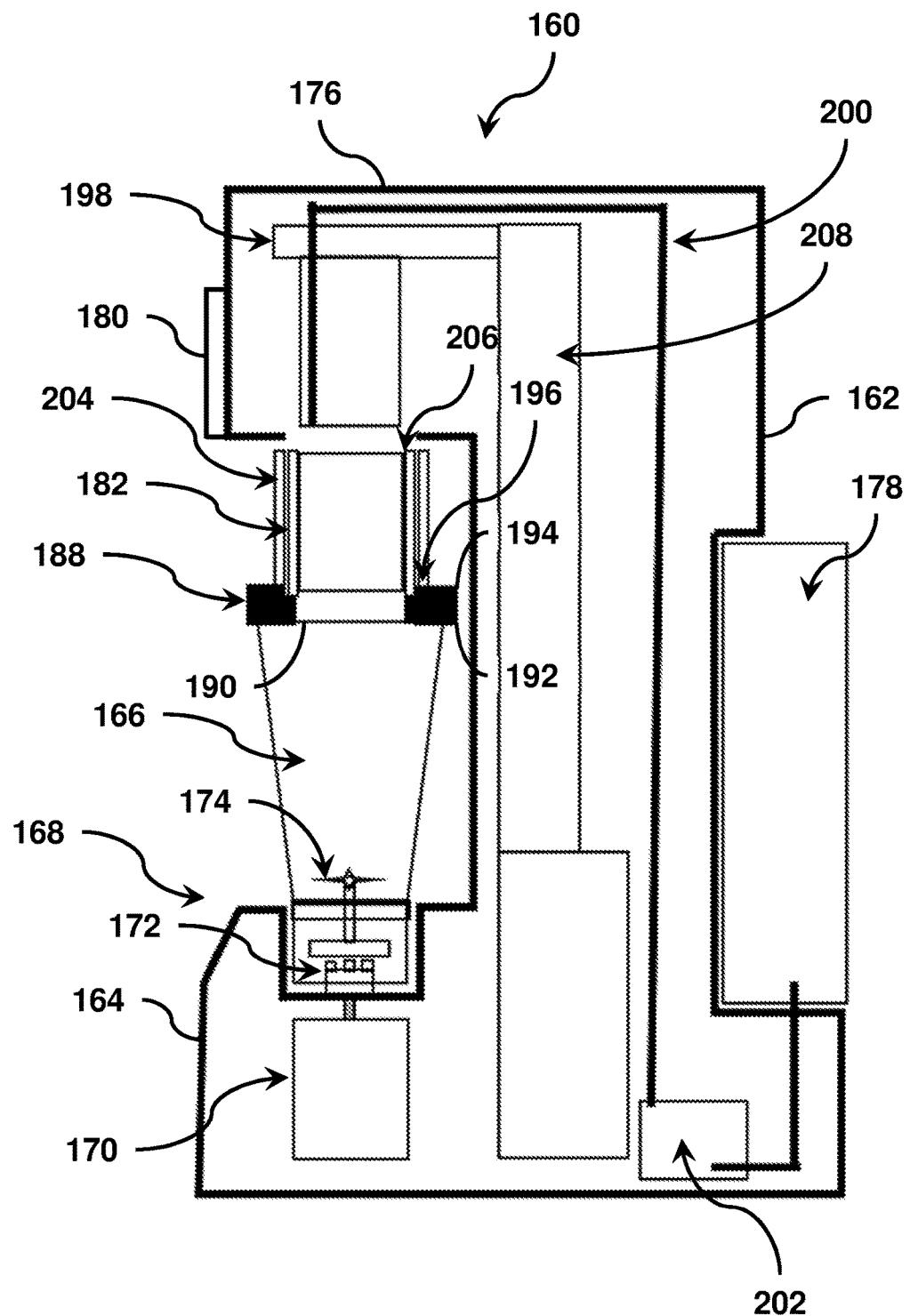
FIG. 12 is a schematic view of an individual frozen drink dispenser of another embodiment of the present disclosure in a pre-dispense position.

Referring to FIG. 12, another embodiment of an individual frozen drink dispenser of the present disclosure is generally indicated at 160. The dispenser 160 of the present embodiment can operate in a manner similar to the dispenser 10 described above with some differences, one of which is that the dispenser 160 includes a mechanism for proving heat to the contents of a frozen product container. Accordingly, a description of redundant components and/or functionalities of the dispenser 160, relative to the dispenser 10 may generally be omitted for the sake of brevity. It should be appreciated, however, that any of the components and/or functionalities of the dispenser 10 described above may be readily adopted and applied to the dispenser 160 of the present embodiment. As shown in FIG. 12, the dispenser 160 includes a housing 162 with a forwardly protruding base 164 configured to support a blender cup 166 for the dispensed frozen beverage. The dispenser 160 further includes a blender assembly generally indicated at 168 having a motor 170 provided within the base 164 to power the operation of a drive mechanism 172 associated with the blender cup 166. As shown, the drive mechanism 172 is coupled to a plurality of blades 174 provided within the blender cup 166 to chop or otherwise blend the material deposited in the blender cup 166. The housing 162 further includes an upper chamber 176 positioned above the base 164. The housing 162 further includes a water reservoir 178 positioned at a rear of the housing 162 and an electronic control panel 180 provided on a front surface of the housing 162 to control the operation of the dispenser 160. In one embodiment, the control panel 180 functions as a user interface designed to manipulate a controller, which controls the operative components of the dispenser 160.

Figure 14:
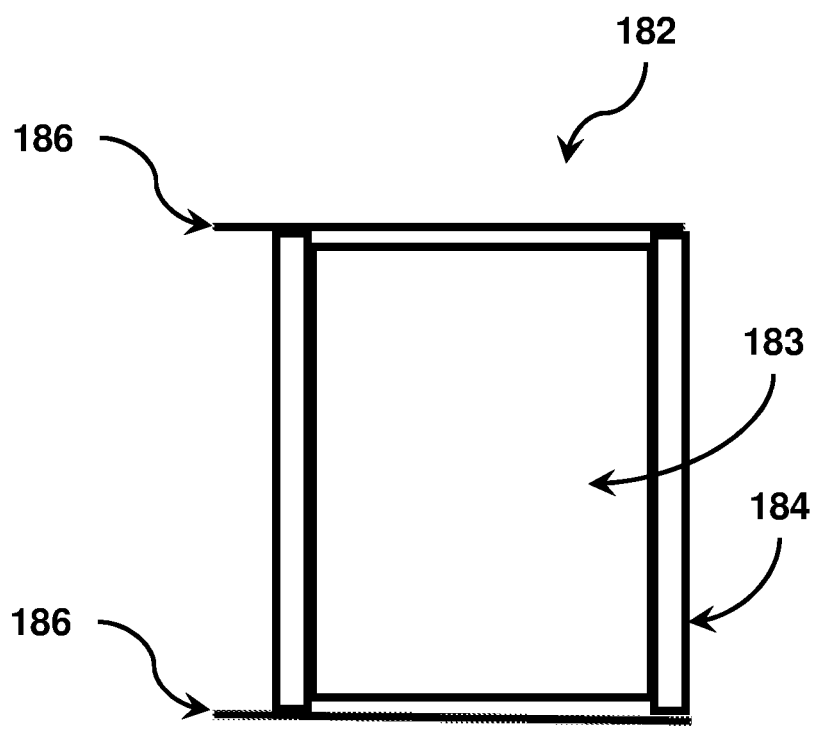
FIG. 14 is a schematic view of a frozen pod or cartridge that is used with the individual frozen drink dispenser shown in FIG. 12.

Referring to FIG. 14, a frozen product container, such as a pod or cartridge, is generally indicated at 182. As shown, the pod 182 includes a generally cylindrical packaging tube 184 and two peel-away seals, each indicated at 186, provided at open ends of the tube 184. The arrangement is such that a product 183 for dispensing is disposed within the tube 184 and held in place by the seals 186. During use, the seals 186 are removed by pealing them away from the tube 184, and the pod 182 is utilized to dispense the frozen product 183 contained within the tube of the pod 182 into the blender cup 166. In some embodiments, the tube 184 of the pod 182 includes an impermeable container fabricated from cardboard or plastic material to contain frozen edible ingredients (i.e., product 183). In other embodiments, the seals 186 of the pod 182 include foil or some other materials suitable for containing the product 183 within the tube 184 of the pod 182 and for peeling away from the tube 184 when it is desired to use the pod 182. In some embodiments, one or both of the seals 186 may be provided as any other appropriate type of seal, for example as pressure seal, etc. Although the tube 184 of the pod 182 is shown to be cylindrical in shape, other suitable shapes may be provided that are tailored to the shapes of devices that are used to move the product 183 out of the tube 184.

In one embodiment, the pod 182 contains ingredients in liquid or non-frozen condition that are placed in a freezer for cooling. The pod may take any suitable form depending on the size and form factor of the dispenser 160. The pod 182 may be impervious to air and/or liquid. As with cartridge 34, the product 183 of the pod 182 may include edible frozen ingredients, such as fruit, milk, a drink mix, and/or any other suitable ingredient for creating a frozen beverage, such as a smoothie or the like. In preparing a frozen drink, such as a smoothie, the process of preparing a beverage may include infusion, mixing, dissolving or otherwise forming a drinkable substance using water or other beverage precursor (e.g., flavored or otherwise treated water, or other liquid, such as milk) with the edible ingredient contained within the pod 182.

Referring back to FIG. 12, in one embodiment, a pod support 188 is positioned on a top lip or edge 190 of the blender cup 166. As shown, the pod support 188 includes a lower surface 192 configured to seat the pod support 188 on the edge 190 of the blender cup 166 and an upper surface 194 having a recess 196 formed therein, the recess 196 being sized to receive the pod 182 within the recess 196 after removing the seals 186 from the tube 184 of the pod 182. In another embodiment, the pod support 188 may be supported by the housing 162 below the chamber 176. The dispenser 160 further includes a dispense plunger 198 within the chamber 176, with the dispense plunger 198 being controlled by an operator via the electronic control panel 180. The dispense plunger 198 drives the downward movement of ingredients contained within the tube 184 of the pod 182 into the blender cup 166. The dispenser 160 further includes a water line 200 for introducing a predetermined amount of water into the dispense plunger 198 from the water reservoir 178. A pump 202 is provided within the housing 162 of the dispenser 160 to move the water from the reservoir 178 through the water line 200. In one embodiment, the pump 202 is also controlled by the controller associated with the electronic control panel 180. The water line 200 is provided to introduce water into the blender cup 166 via the dispense plunger 198. The water is used to prepare the frozen beverage.

The pod support 188 of the present embodiment further includes a pod heater 204. The pod heater 204 is provided on the upper surface 194 of the pod support 188. As shown, the pod heater 204 is generally cylindrical and hollow. The pod heater 204 is configured to receive the pod 182 within an interior space 206 of the pod heater 204. The pod heater 204 may be sized and shaped such that an interior surface of the pod heater 204 substantially corresponds to a size and shape of a corresponding exterior surface of the pod 182 such that, with the pod 182 positioned within the pod heater 204, the interior surface of the pod heater 204 is in direct, or nearly-direct, contact with the exterior surface of the pod 182. The pod heater 204 may have one or more heating elements (e.g., wire heating elements, ribbon heating elements, strip heating elements, etc.) located about the entire, or a discrete portion of, the circumference of the pod heater 204. The one or more heating elements may be located on a surface of, or encased within, a body of the pod heater 204.

Thus, it should be appreciated that, with the pod 182 positioned within the pod heater 204, the pod heater 204 may provide heat to the pod 182 so as to heat, thereby melting, a portion (e.g., an outer layer) of the ingredients contained within the pod 182. In this manner, a fluid layer or viscous layer is formed between the ingredients contained within the pod 182 and an interior surface of the tube 184 of the pod 182. As a result, less force is required from the dispense plunger 198 to drive the downward movement of ingredients contained within the pod 182. In one embodiment, the heater 204 is controlled by the controller associated with the electronic control panel 180 and automated to control the heater for a predetermined period of time and/or to a predetermined temperature of the heater or pod outer surface. FIG. 12 illustrates the dispense plunger 198 of the dispenser 160 in a pre-dispense or upper position. In this position, the pod 182 with seals 186 removed from the tube 184 may be placed on the pod support 188 within the pod heater 204 with the dispense plunger 198 disposed above the pod 182.

Figure 13:
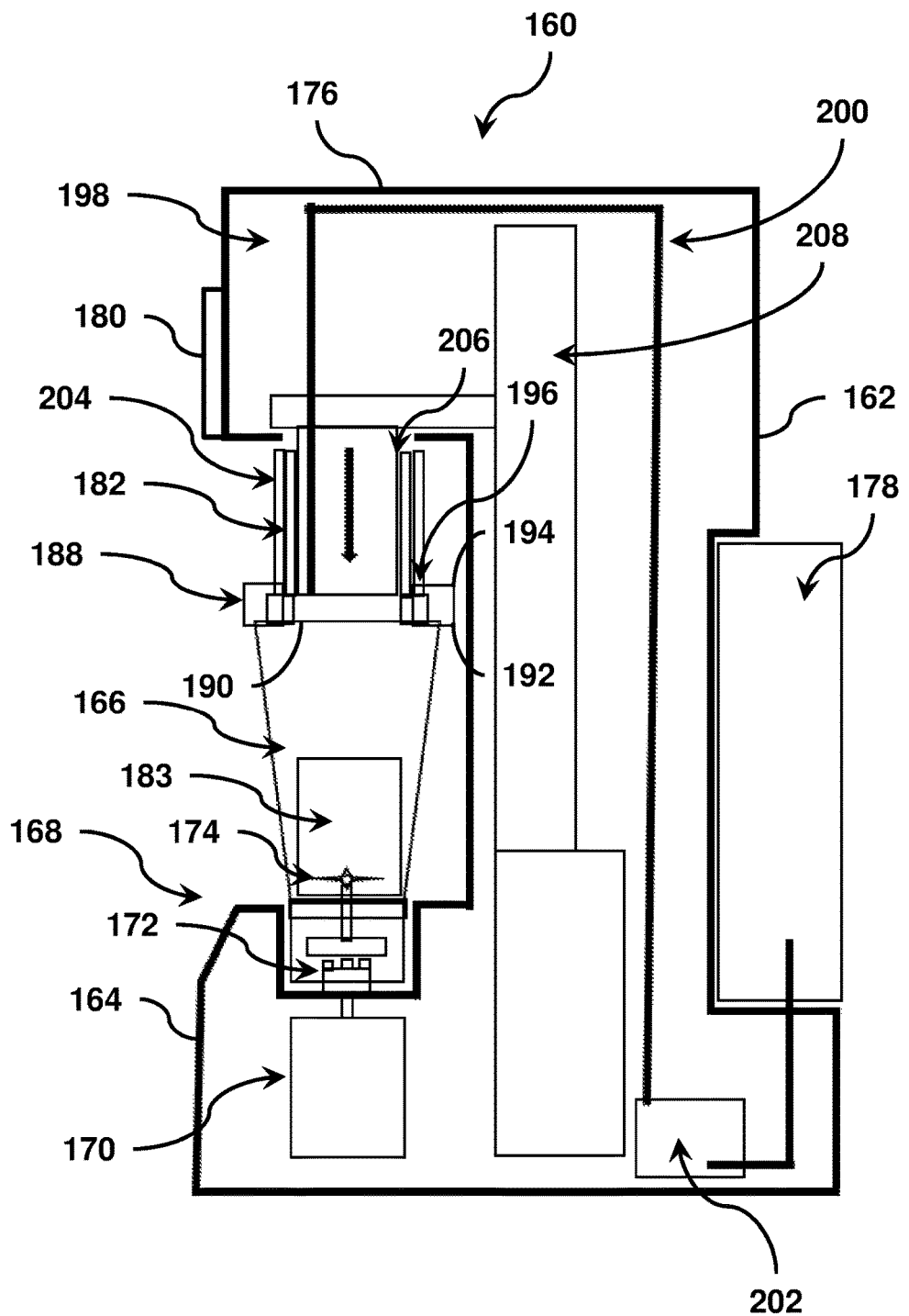
FIG. 13 is a schematic view of the individual frozen drink dispenser of FIG. 12 in a dispense position.

FIG. 13 illustrates the dispense plunger 198 of the dispenser 160 in a dispense or lower position. As shown, the dispenser 160 includes a plunger drive mechanism 208 that is coupled to the dispense plunger 198 to drive the up-and-down movement of the dispense plunger 198 within the chamber 176. In one embodiment, the plunger drive mechanism 208 operates under the control of the controller associated with the control panel 180. After the pod heater 204 has heated the ingredients contained within the pod 182, the dispense plunger 198 is moved toward the dispense position and into the tube 184 of the pod 182 to push the ingredients contained within the pod 182 into the blender cup 166. As shown, the dispense plunger 198 is sized to tightly fit within the tube 184 of the pod 182 so that when moving the dispense plunger 198 downwardly with the plunger drive mechanism 208, the dispense plunger 198 moves all, or nearly all, of the ingredients contained within the pod 182 out of the pod 182 and into the blender cup 166. Once dispensed, the dispense plunger 198 returns to its upper, pre-dispense position. Water is then introduced into the blender cup 166 by operating the pump 202 and the motor 170 drives the rotation of the blades 174 via the drive mechanism 172 to blend the ingredients to prepare the frozen drink.

Once blended, the cycle is complete and the blender cup 166 may be removed from the base 164 of the dispenser 160 and the pod 182 is removed from the pod support 188. Next, the pod support 188, including the pod heater 204, is removed from the upper edge 190 of the blender cup 166 in which the frozen drink contained within the blender cup 166 is ready to drink. It should be appreciated that the pod heather 204 may provide heat to the ingredients contained within the pod 182 for a predetermined amount of time prior to or during the dispense plunger 198 being moved toward the dispense position. Alternatively, the pod heather 204 may provide heat to the ingredients contained within the pod 182 during the entire cycle. Further, the controller may be configured to drive the dispense plunger 198 toward the dispense position only after the pod heather 204 has heated the ingredients contained within the pod 182 for a predetermined amount of time or until another predetermined criteria is satisfied such as the pod heather 204 or the ingredients contained within the pod 182 reaching a predetermined temperature as measured by one or more temperature gauges or thermometers. This predetermined time or other criteria may be determined on the basis of ensuring that the above-mentioned fluid layer is sufficiently formed between the ingredients contained within the pod 182 and the interior surface of the tube 184 of the pod 182.

Although the pod heater 204 is described as being provided on the upper surface 194 of the pod support 188, it should be appreciated that the pod heater 204 may be provided at, or attached to, any appropriate component of the dispenser 160 including the dispense plunger 198. Specifically, the pod heater 204 may be provided as an extendable/retractable component of the dispense plunger 198. In such an embodiment, the pod heater 204 may be passed over the pod 182 in advance of the dispense plunger 198 being moved into the dispense position and may be realigned to the dispense plunger 198 as the dispense plunger 198 moves into the dispense position and downward toward the pod 182 to drive the downward movement of ingredients contained within the pod 182. Further, although the pod heater 204 is shown to be cylindrical in shape, any other suitable shape may be provided. In addition, it should be appreciated that the pod heater 204 may be provided with an insulative layer disposed about some, or all, of those portions of the pod heater 204 not required to be in contact with the pod 182 (i.e., non-heating surfaces). In this manner, the insulative layer may protect users from being burned due to heat from the one or more heating elements. Finally, it should be appreciated that the tube 184 of the pod 182 may be completely, or partially, formed of thermally conductive material to assist in the transfer of heat from the pod heater 204 to the ingredients contained within the pod 182.

Figure 15:
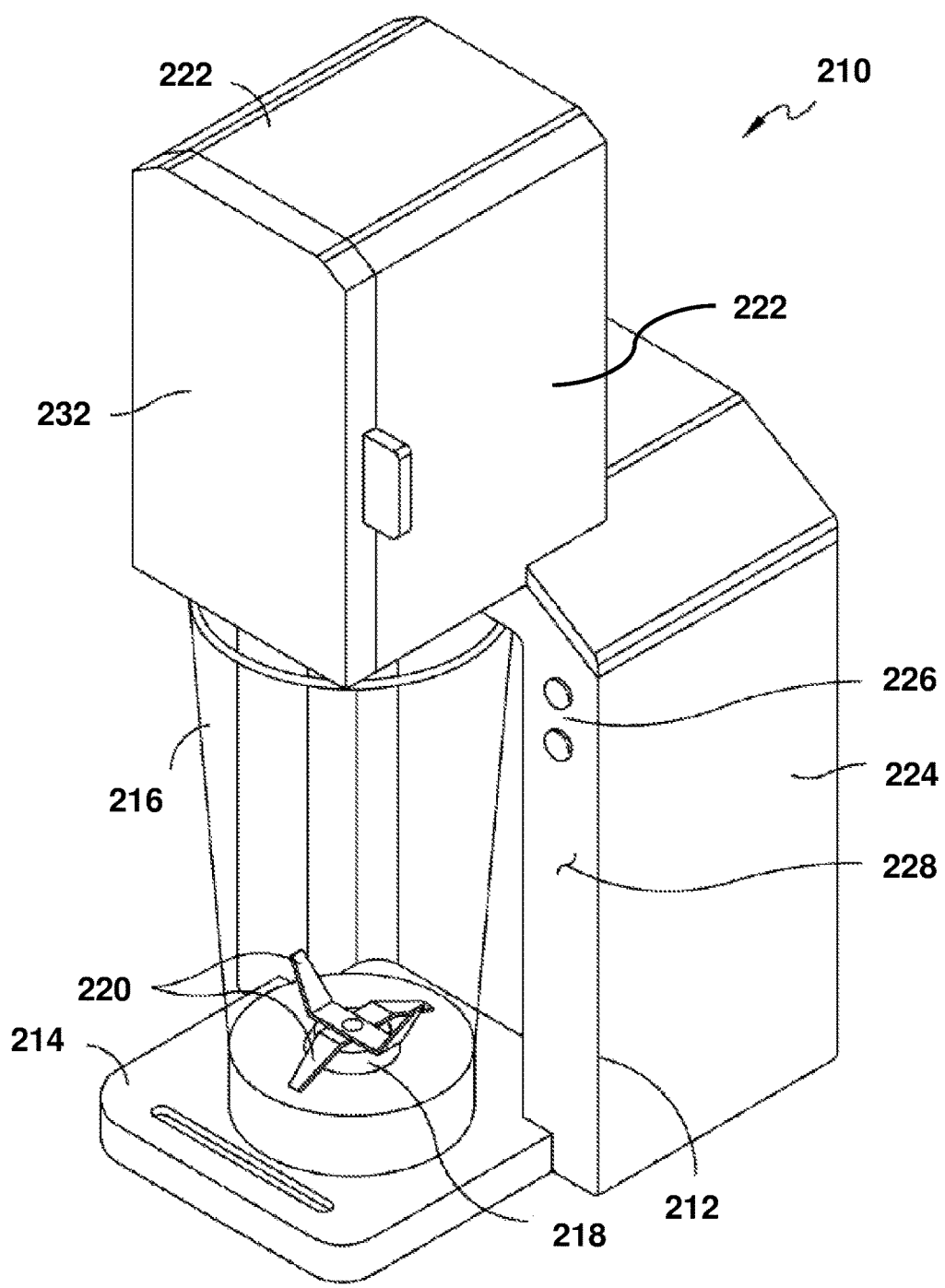
FIG. 15 is a perspective view of an individual frozen drink dispenser of an embodiment of the present disclosure.

Referring to the drawings, and more particularly to FIG. 15, there is generally indicated at 210 a single serve or individual frozen drink dispenser. The dispenser 210 includes a housing 212 with a forwardly protruding bottom shelf 214 arranged to support a blender cup 216 for a dispensed frozen beverage. A blender drive 218 is provided on the bottom shelf 214 to drive the operation of blades 220 provided in the blender cup 216. The housing 212 further includes a dispensing chamber 222 positioned above the bottom shelf 214. The dispensing chamber 222 includes a cartridge receptacle 230 and a door 232 that provides access to the cartridge receptacle 230. The cartridge receptacle 230 is configured and dimensioned to receive a disposable, frozen beverage container 234 (not shown in FIG. 15). The housing 212 further includes a water reservoir 224 positioned at the rear of the housing and an electronic control panel 226 provided on a front surface 228 of the housing to control the operation of the dispenser 210.

Figure 16A:
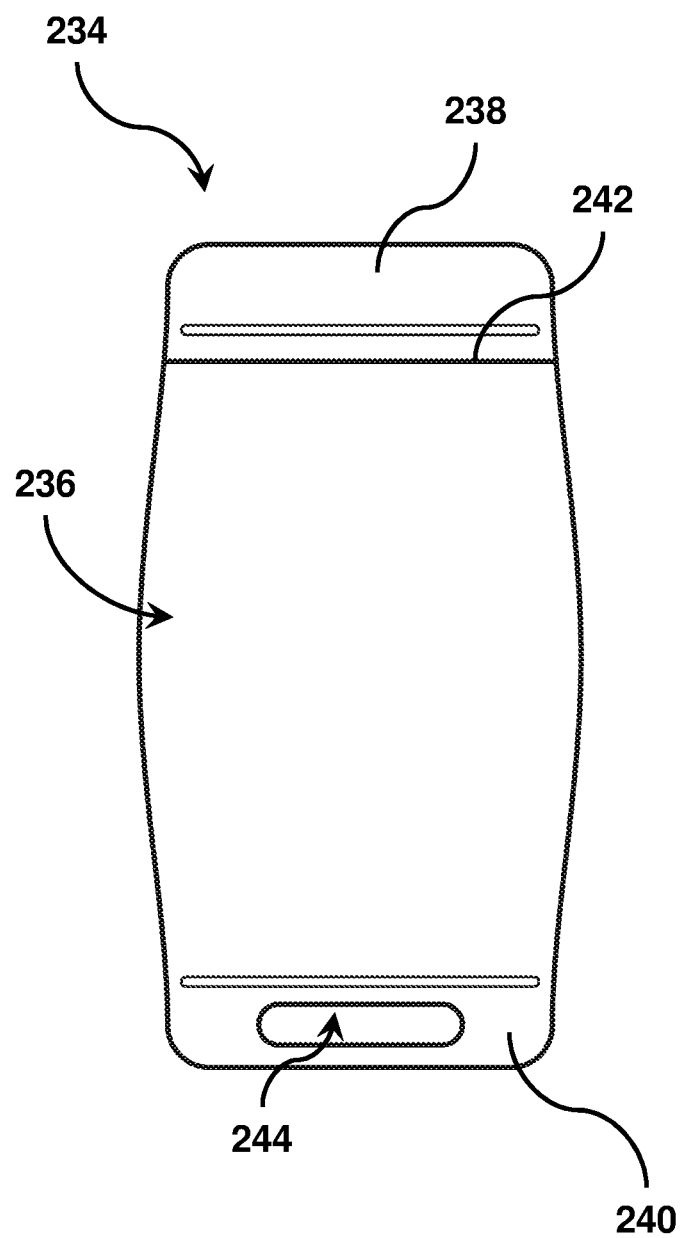
FIGS. 16(a) and 16(b) are front views of an individual pouch for use with the frozen drink dispenser of FIG. 15.
Figure 16B:
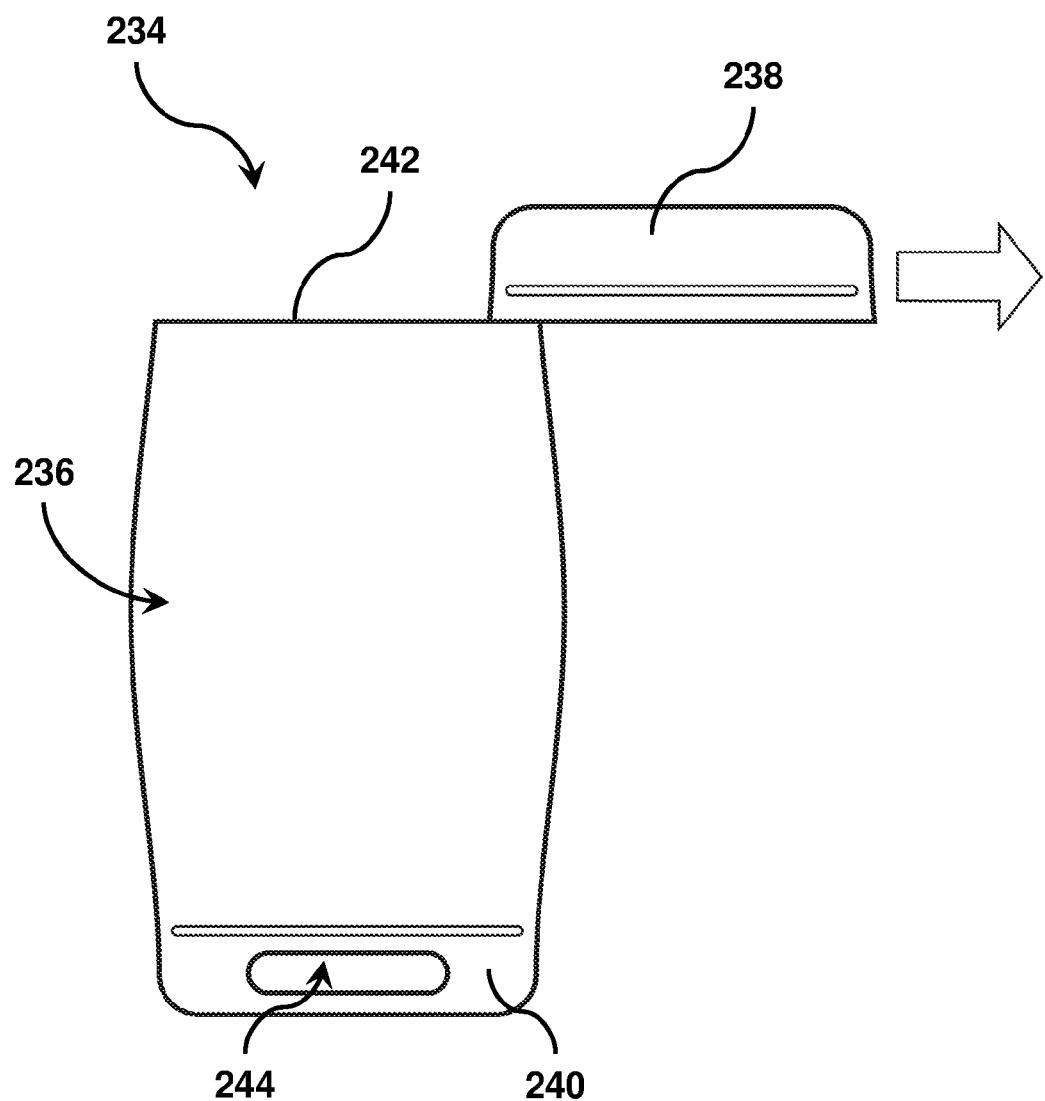

Referring to FIGS. 16(*a*) and 16(*b*), the frozen beverage container 234 of the present embodiment includes an impermeable pouch 236, which can be fabricated from to contain frozen edible ingredients 237. The frozen beverage container 234 contains ingredients in liquid or non-frozen condition that are placed in a freezer for cooling. The container may take any suitable form depending on the size and form factor of the dispenser 210. The frozen beverage container 234 may be impervious to air and/or liquid. The frozen beverage container 234 may include edible frozen ingredients, such as fruit, milk, a drink mix, and/or any other suitable ingredient for creating a frozen beverage, such as a smoothie or the like. In preparing a frozen drink, such as a smoothie, the process of preparing a beverage may include infusion, mixing, dissolving or otherwise forming a drinkable substance using water or other beverage precursor (e.g., flavored or otherwise treated water, or other liquid) with the edible ingredient contained within the frozen beverage cartridge. Also, reference to "water" herein is to any suitable water formulation, e.g., filtered, de-ionized, softened, etc., as well as any other suitable precursor liquid used to form a frozen beverage, such as sweetened or flavored water, milk, etc.

The frozen beverage container 234 of the present embodiment includes a seal tab 238 and a support tab 240. The seal tab 238 and the support tab 240 project from opposite ends (e.g., a top end and a bottom end) of the impermeable pouch 236. The seal tab 238 is secured to the impermeable pouch 236 along a tear line 242. As will be discussed in more detail below, the seal tab 238 may be used to selectively open the impermeable pouch 236 along the tear line 242 (i.e., may be used as a tear-type seal). For example, as shown in FIG. 16(*b*), the impermeable pouch 236 may be opened at one end by tearing the seal tab 238 from the impermeable pouch 236 along the tear line 242. It should be appreciated that the impermeable pouch 236 and/or the seal tab 238 may include features to make opening of the impermeable pouch 236 along the tear line 242 easier. For example, the impermeable pouch 236 and/or the seal tab 238 may include perforations, serrations, crimping, one or more notches, etc. at or near the tear line 242. Further, although a tear-type seal is used in the present embodiment to open the impermeable pouch 236, other appropriate types of seals may be used to open the impermeable pouch 236. For example, a heat seal, a pressure seal, a zip-top seal, etc. may be used in addition to or in lieu of the tear-type seal provided by the seal tab 238 and the tear line 242.

Figure 17:
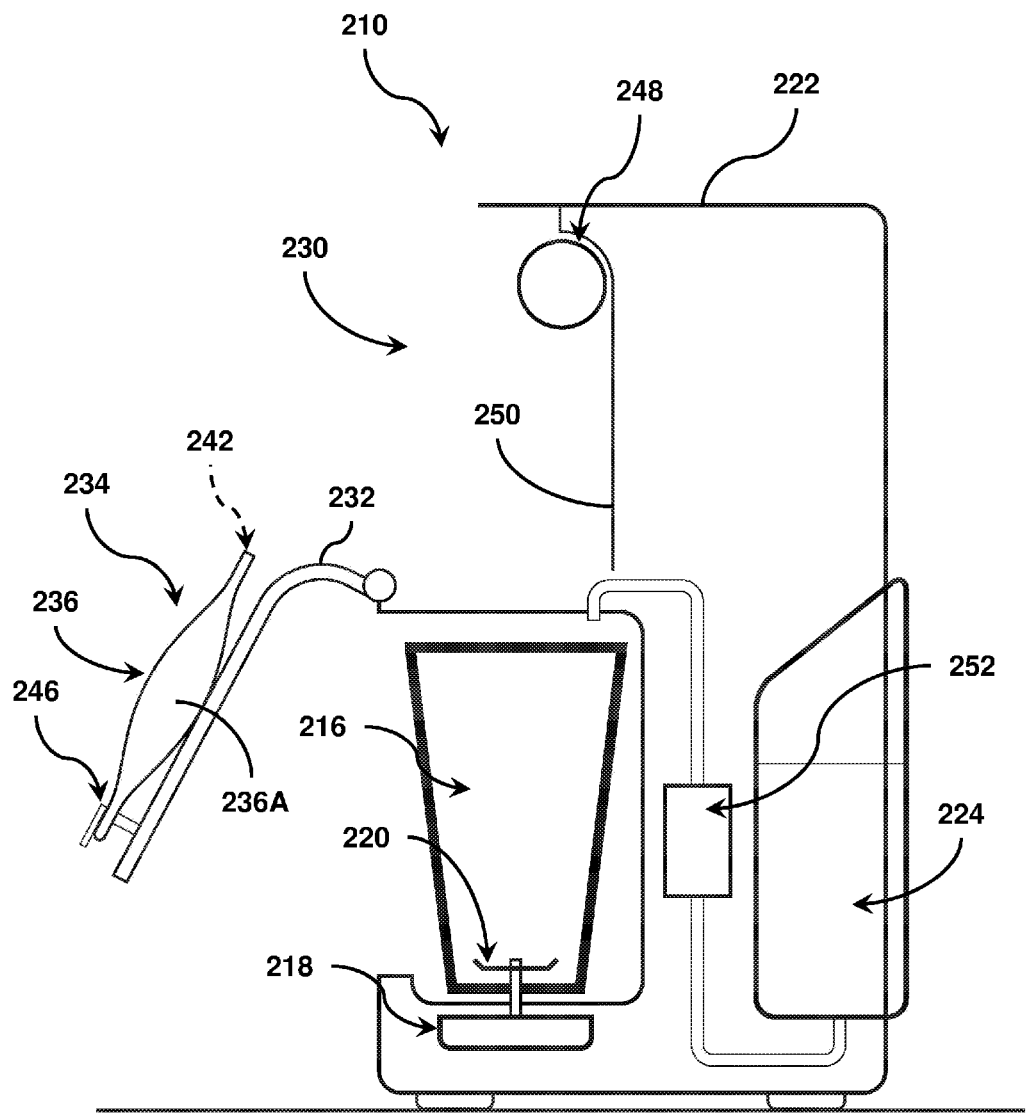
FIG. 17 is a schematic side view of a frozen drink dispenser with a door of a dispensing chamber in an open position and with the individual pouch of FIGS. 16(a) and 16(b) supported on the door.

The support tab 240 includes an elongated opening 244. The elongated opening 244 may be used to secure the frozen beverage cartridge 234 to the dispenser 210. For example, as shown in FIG. 17, with the door 232 of the dispensing chamber 222 in an open position, the frozen beverage container 234 may be secured to an interior surface of the door 232 via a support arm 246 projecting from the interior surface of the door 232. In particular, the frozen beverage container 234 may be secured to the door 232 by hooking the support tab 240 to the support arm 246 via the elongated opening 244. In other embodiments of the dispenser 210, the frozen beverage cartridge 234 may be secured to the door 232 via other appropriate means including receipt within a pocket, friction (or interference) fit, hook-and-loop, snap button, etc.

Figure 18:
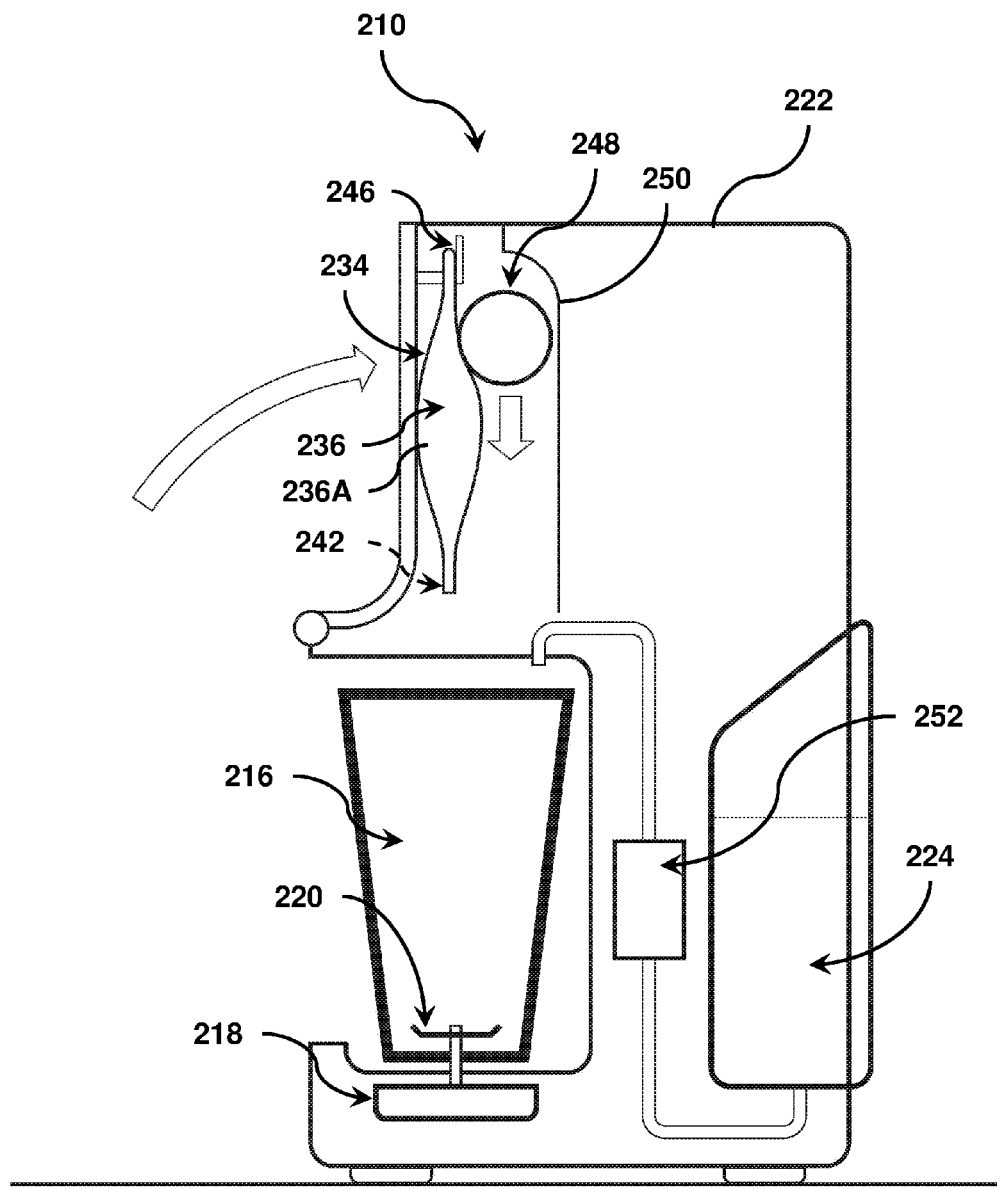
FIG. 18 is a schematic side view of a frozen drink dispenser of with the door of the dispensing chamber moved into a closed position and with a dispensing roller of the dispensing chamber in a pre-dispense (or upper) position.
Figure 19:
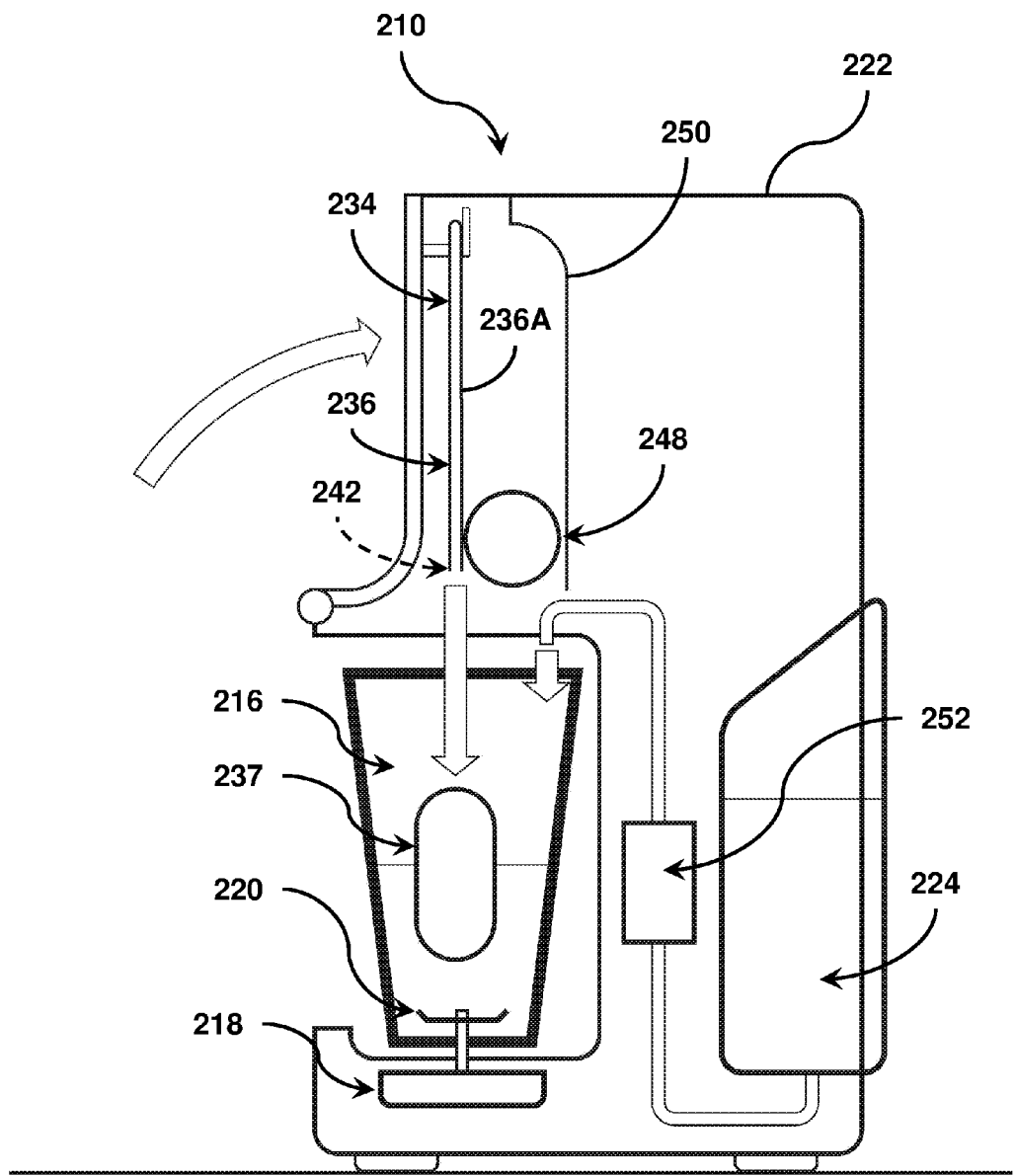
FIG. 19 is a schematic side view of a frozen drink dispenser with the door of the dispensing chamber in the closed position and with the dispensing roller of the dispensing chamber moved into a dispense (or lower) position.

Referring to FIGS. 17-19, the dispensing chamber 222 includes a dispensing roller 248. The dispensing roller 248 may be controlled by the electronic control panel 226, automated in response to closure of the door 232 or manually driven. The dispense roller 248 is movable upward and downward along a track 250 between a pre-dispense (or upper) position (FIGS. 17 and 18) and a dispense (or lower) position (FIG. 19) to thereby drive the downward movement of the frozen edible ingredients 237 contained within the frozen beverage cartridge 234. In particular, as shown in FIG. 18, after the frozen beverage cartridge 234 is opened and secured to the door 232, the door 232 may be moved into a closed position. In this closed position, with the dispensing roller 248 initially in the pre-dispense (or upper) position, the dispensing roller 248 bears against a first side 236A of the impermeable pouch 236 near the support tab 240 (i.e., at a position above the frozen edible ingredients 237 within the impermeable pouch 236). The first side 236A of the impermeable pouch 236 is flexible such that force applied to the impermeable pouch 236 is imparted upon the frozen edible ingredients 237 within the impermeable pouch 236.

As shown in FIG. 19, as the dispensing roller 248 moves downward along the track 250 toward the dispense (or lower) position, the dispensing roller 248 continuously bears against the first side 236A of the impermeable pouch 236. In this manner, the dispensing roller 248 squeezes (or presses) the frozen edible ingredients 237 downward and out of the impermeable pouch 236 via the opening formed at the tear line 242. The frozen edible ingredients 237 squeezed (or expelled) from the impermeable pouch 236 are received within the blender cup 216 positioned beneath the impermeable pouch 236. Once fully expelled, a pre-measured amount of water is delivered to the blender cup 216 from the water reservoir 224 by operating a water pump 252. Once the blender cup 216 is filled with the frozen edible ingredients 237 and water, the blender drive 218 is operated to rotate the blades 220 provided in the blender cup 216. This operation blends or mixes the frozen edible ingredients 237 and the water within the blender cup 216 to create the finished drink (e.g., a smoothie) that is suitable for consumption. Once the frozen drink is prepared, the door 232 to the dispensing chamber 222 may be opened to remove the depleted frozen beverage cartridge 234. At this point the process of preparing another frozen beverage may begin again.

To ensure the frozen edible ingredients 237 are substantially completely expelled from the impermeable pouch 236, the dispensing roller 248 may extend across the entire (or substantially the entire) width of the impermeable pouch 236. Further, although the first side 236A of the impermeable pouch 236 is flexible, an opposite side of the impermeable pouch 236 may be rigid in some embodiments of the dispenser 210 so as to provide a rigid surface upon which the dispensing roller 248 may bear. Also, to facilitate dispensing of the frozen edible ingredients, a heating mechanism can be provided to heat the container in a manner similar to that described above.

The water reservoir 224 is connected to a water pump 252, which drives the movement of the water from the water reservoir to the blender cup 216 before, during, or after the frozen edible ingredients 237 are squeezed (or expelled) from the impermeable pouch 236 into the blender cup 216. The dispenser 210 further includes an electronic control box that is coupled to the water pump 252, the blender drive 218, and to the electronic control panel 226. The electronic control box is further coupled to a drive motor to drive the up-and-down movement of the dispensing roller 248, and to the blender drive 218 to rotate the blades 220 of the blender cup. The electronic control box, via the electronic control panel 226, controls the operation of these component parts of the dispenser 210.

Although the dispenser 210 of the present embodiment includes a blender cup 216 with blades 220, it should be appreciated that in some embodiments of the dispenser 210, the blender cup 216 may be replaced with a standard mixing cup (i.e., a cup without blades). In such embodiments of the dispenser 210, the blades 220 may be provided as a component of the dispensing chamber 222, for example, at an end of a drive shaft, to be selectively extended and retracted therefrom or otherwise relatively move the cup and the blades to carry out blending in the cup. In particular, the blades 220 may be configured to selectively extend downward from the dispensing chamber 222 and into the mixing cup so as to blend or mix the frozen edible ingredients 237 and the water within the mixing cup to create the finished drink, e.g., a smoothie, that is suitable for consumption.

Finally, although the dispenser 210 of the present embodiment is described as having only a single dispensing roller 248, it should be appreciated that the dispenser 210 may include any appropriate number of dispensing rollers 248. Such dispensing rollers 248 may be arranged in parallel (i.e., horizontally/in a width direction relative to one another), in series (i.e., vertically/in a length direction relative to one another), or in any other appropriate pattern on one or both sides of the frozen beverage cartridge 234. Further, in addition to or in lieu of the dispensing roller 248 (i.e., a roller), any other appropriate mechanism for squeezing (or expelling) the frozen edible ingredients 237 from the frozen beverage cartridge 234 may be used. In addition, although the frozen beverage cartridge 234 of the present embodiment is described as being opened via a seal formed in the impermeable pouch 236, it should be appreciated that the frozen beverage cartridge 234 may be opened vial a nozzle, etc. in fluid communication with an interior of the impermeable pouch 236.

Referring now to FIGS. 20-24, another embodiment of an individual frozen drink dispenser of the present disclosure is generally indicated at 270. The dispenser 270 of the present embodiment operates substantially similar to the dispenser 210 described above except for some differences, one of which is that the dispenser 270 includes a mechanism for automatically opening a frozen beverage cartridge 272. Accordingly, a description of redundant components and/or functionalities of the dispenser 270 relative to the dispenser 210 will generally be omitted for the sake of brevity. It should be appreciated, however, that any of the components and/or functionalities of the dispenser 210 described above may be readily adopted and applied to the dispenser 270 of the present embodiment.

Figure 24:
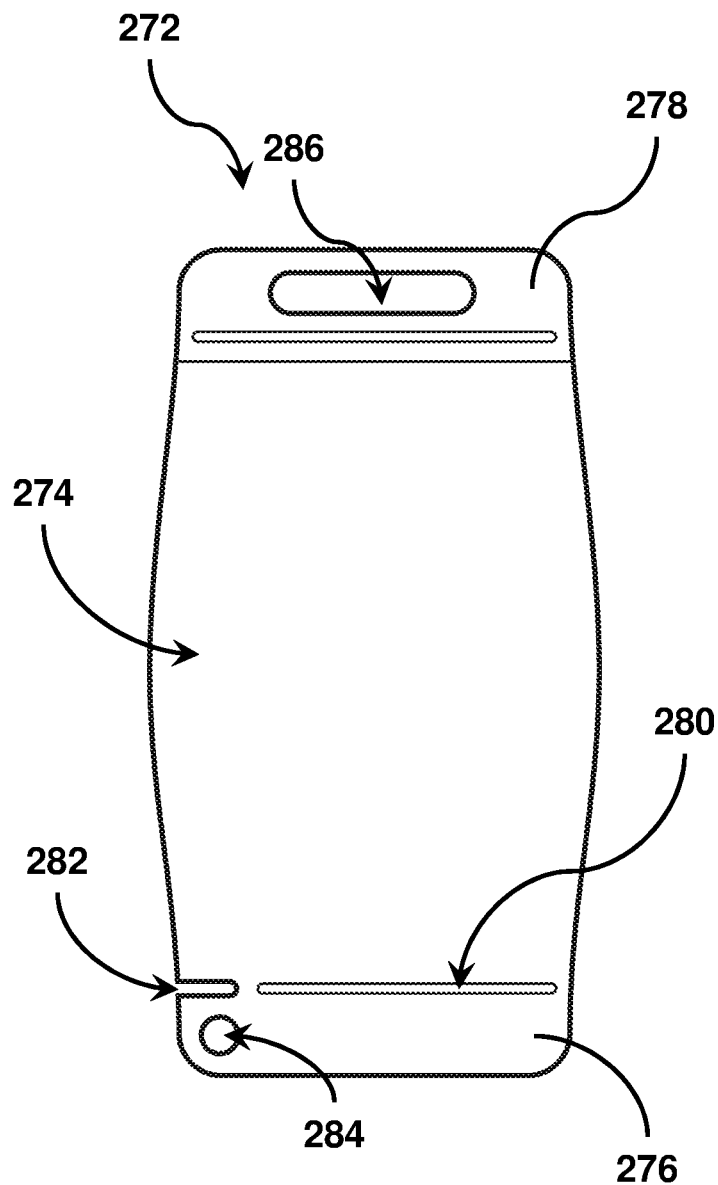
FIG. 24 is a front view of an individual pouch for use with the frozen drink dispenser.

Referring to FIG. 24, the frozen beverage container 272 of the present embodiment includes an impermeable pouch 274. The frozen beverage cartridge 272 further includes a seal tab 276 and a support tab 278. The seal tab 276 and the support tab 278 project from opposite ends (e.g., a top end and a bottom end) of the impermeable pouch 274. The seal tab 276 is secured to the impermeable pouch 274 along a tear line 280. A notch 282 is provided in the impermeable pouch 274 and/or the seal tab 276 adjacent to the tear line 280. Further, the seal tab 276 includes an opening 284 formed in a side of the seal tab 276 near the notch 282. As will be discussed in more detail below, the seal tab 276 may be used to selectively open the impermeable pouch 274 along the tear line 280 (i.e., may be used as a tear-type seal).

Figure 20:
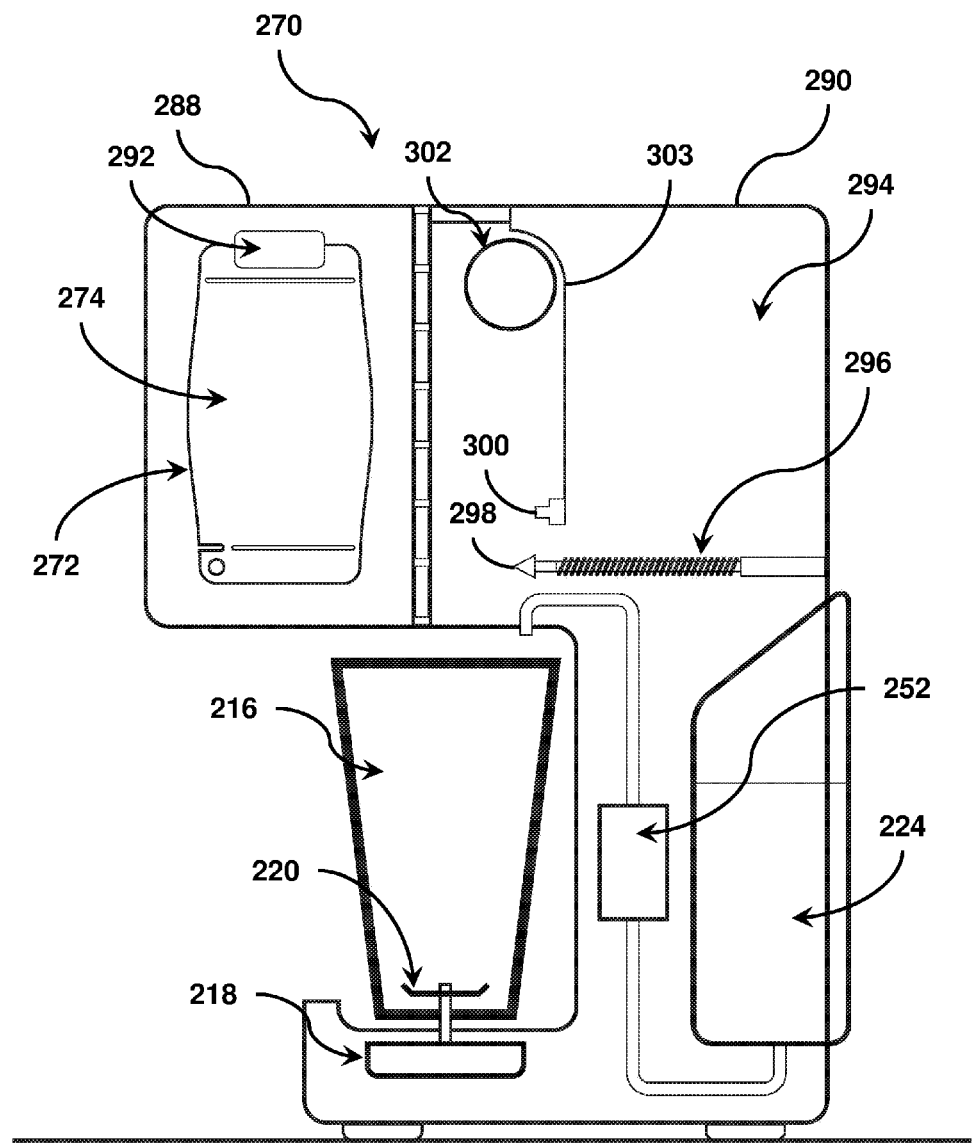
FIG. 20 is a schematic side view of an individual frozen drink dispenser of another embodiment of the present disclosure with a door of a dispensing chamber in an open position, with an individual pouch supported on the door, and with an auto-tear mechanism in a retracted position.

The support tab 278 includes an elongated opening 286. The elongated opening 286 may be used to secure the frozen beverage cartridge 272 to the dispenser 270. For example, as shown in FIG. 20, with a door 288 of a dispensing chamber 290 of the dispenser 270 in an open position, the frozen beverage cartridge 272 may be secured to an interior surface of the door 288 via a support arm 292 projecting from the interior surface of the door 288. In particular, the frozen beverage cartridge 272 is secured to the door 288 by hooking the support tab 278 to the support arm 292 via the elongated opening 286. In other embodiments of the dispenser 270, the frozen beverage cartridge 272 may be secured to the door 288 via other appropriate means including receipt within a pocket, friction (or interference) fit, hook-and-loop, snap button, etc.

Figure 21:
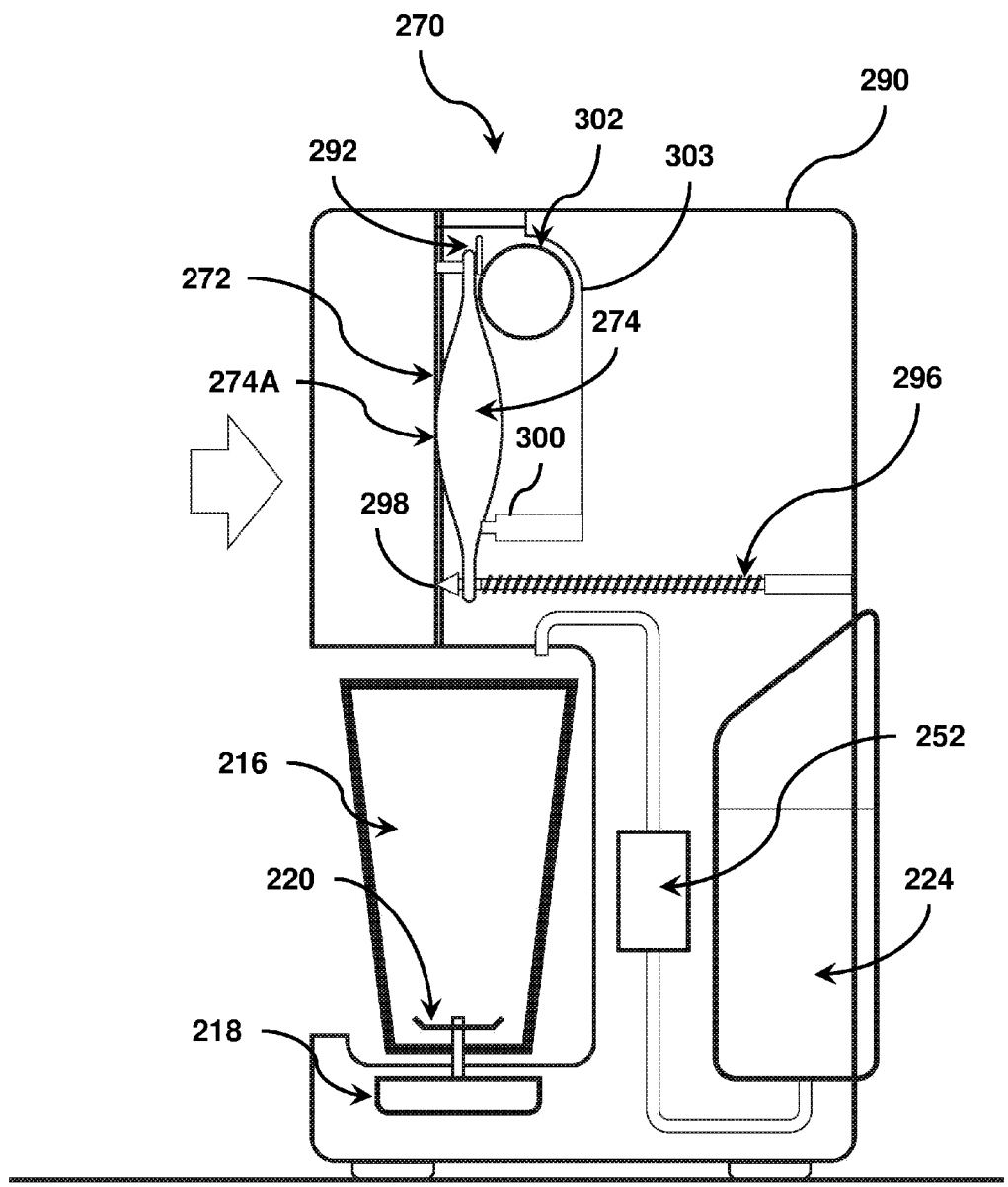
FIG. 21 is a schematic side view of a frozen drink dispenser with the door of the dispensing chamber moved into a closed position, with the auto-tear mechanism moved into an extended position, and with a dispensing roller of the dispensing chamber in a pre-dispense (or upper) position.

The dispensing chamber 290 further includes an auto-tear mechanism 294 and a dispensing roller 302. The auto-tear mechanism 294 and the dispensing roller 302 may be controlled by an electronic control panel or automated in response to closure of the door 288. The auto-tear mechanism 294 includes an extendable tearing arm 296 and an extendable holding arm 300 that are respectively movable between a retracted position (FIG. 20) and an extended position (FIG. 21). The dispense roller 302 is movable upward and downward along a track 303 between a pre-dispense (or upper) position (FIGS. 20-22) and a dispense (or lower) position (FIG. 23) to thereby drive the downward movement of the frozen edible ingredients 237 contained within the frozen beverage cartridge 272.

Figure 22:
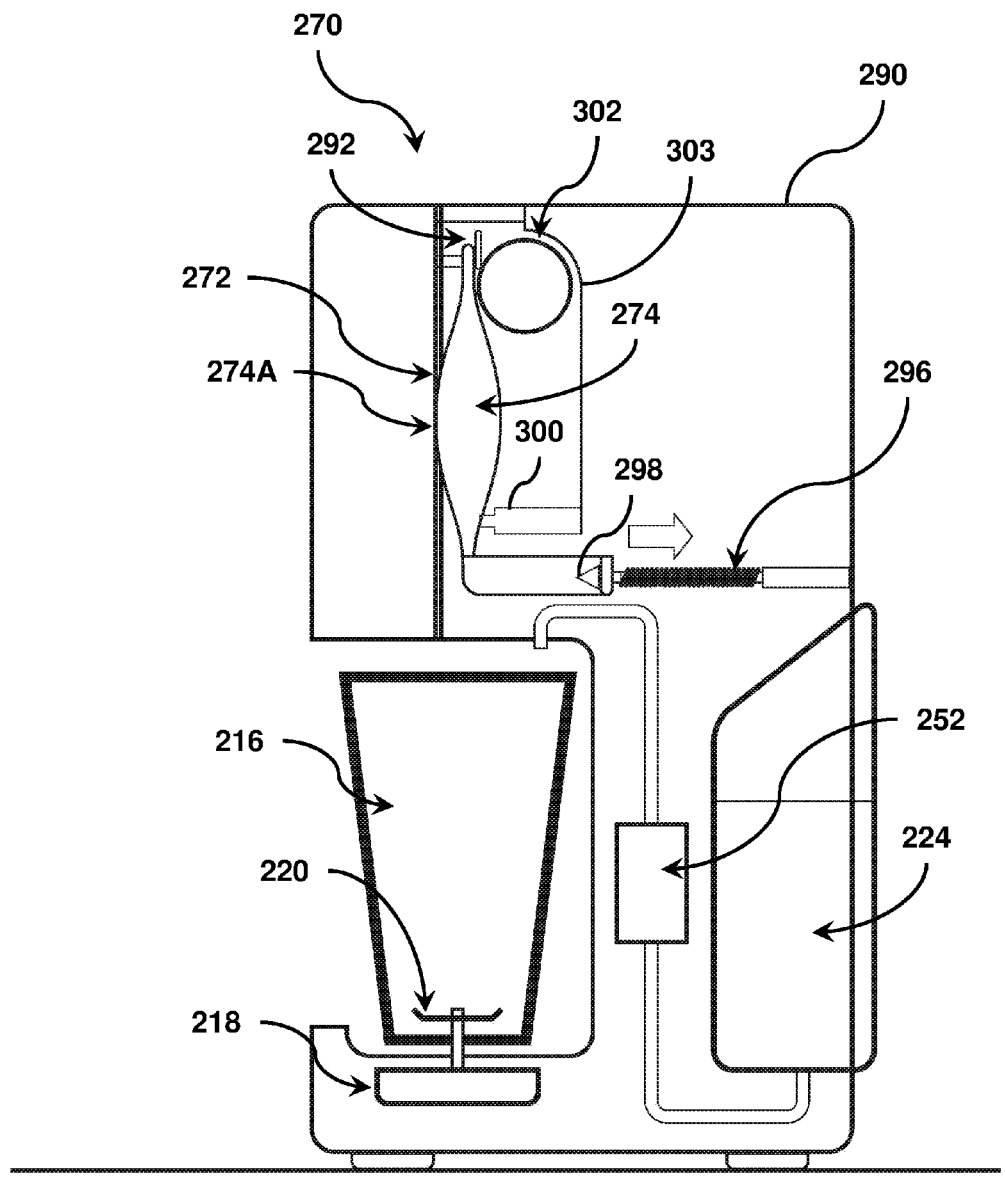
FIG. 22 is a schematic side view of a frozen drink dispenser with the door of the dispensing chamber remaining in the closed position, with the auto-tear mechanism moved back into the retracted position, and with the dispensing roller of the dispensing chamber remaining in the pre-dispense (or upper) position.
Figure 23:
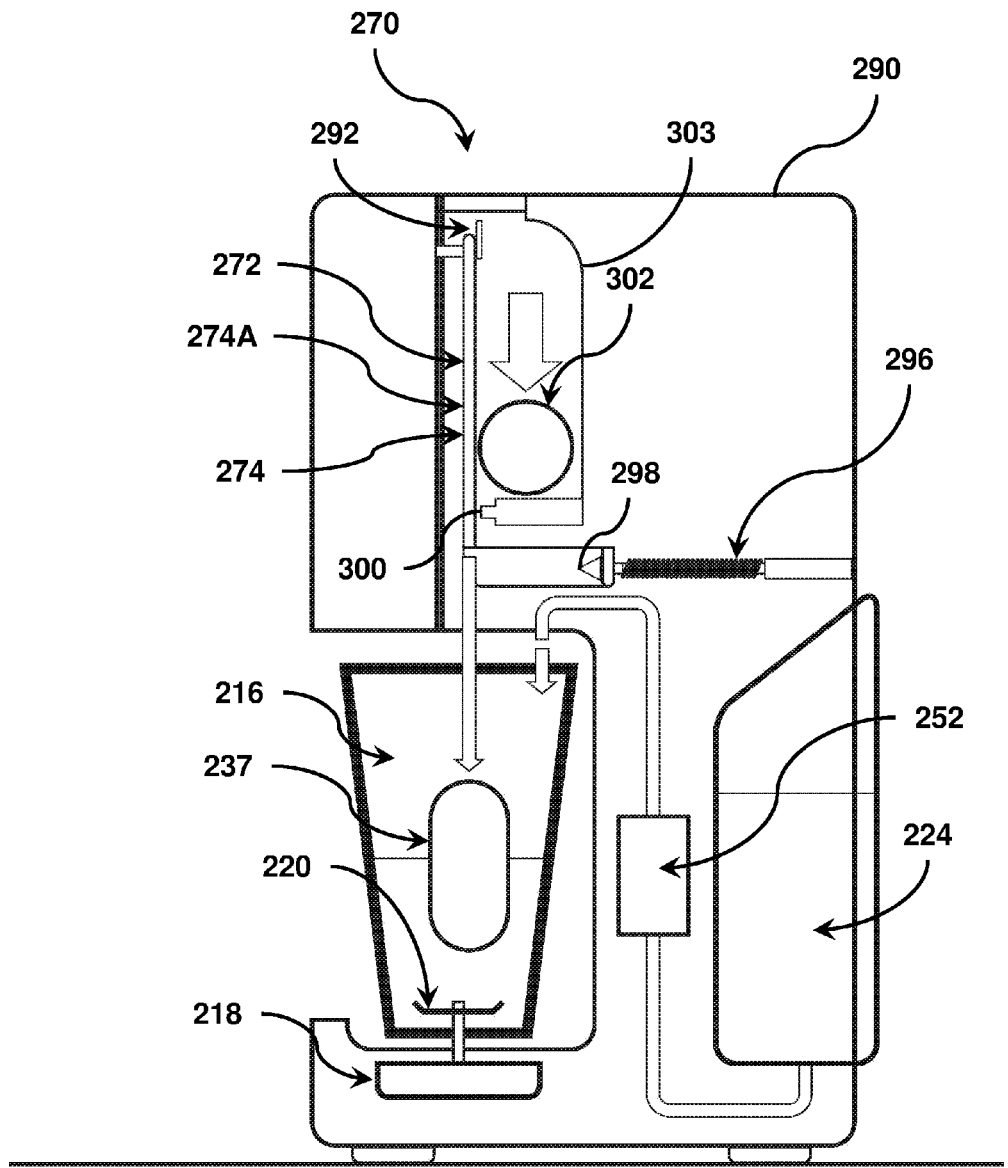
FIG. 23 is a schematic side view of a frozen drink dispenser with the door of the dispensing chamber remaining in the closed position, with the auto-tear mechanism remaining in the retracted position, and with the dispensing roller of the dispensing chamber moved into a dispense (or lower) position.

As shown in FIG. 21, after the frozen beverage cartridge 272 is secured to the door 288, the door 288 may be moved into a closed position. In this closed position, with the dispensing roller 302 initially in a pre-dispense (or upper) position, the dispensing roller 302 bears against a first side 274A of the impermeable pouch 274 near the support tab 278 (i.e., at a position above the frozen edible ingredients 237 within the impermeable pouch 274). At this same time, the extendable holding arm 300 of the auto-tear mechanism 294 is moved into the extended position so as to bear against the first side 274A of the impermeable pouch 274 near the seal tab 276 at a position above the tear line 280. In this manner, the frozen beverage cartridge 272 is held against the interior surface of the door 288 via the dispensing roller 302 and the extendable holding arm 300. At this time, the extendable tearing arm 296 is moved into the extended position such that a pointed tip 298 of the extendable tearing arm 296 passes through the opening 284 of the seal tab 276. The pointed tip 298 has a major diameter that is larger than an inner diameter of the opening 284 of the seal tab 276. Accordingly, the pointed tip 298 effectively grasps the seal tab 276 once the pointed tip 298 is passed therethrough. Then, as shown in FIG. 22, as the extendable tearing arm 296 is moved back into the retracted position the seal tab 276 is torn from the impermeable pouch 274 along the tear line 280 to thereby open the impermeable pouch 274 at the tear line 280. Finally, as shown in FIG. 23, the dispensing roller 302 may be operated to squeeze (or expel) the frozen edible ingredients 237 from the impermeable pouch 274 in the manner described above with reference to the dispensing roller 248 of the dispenser 210.

In the present embodiment, the extendable tearing arm 296 and the extendable holding arm 300 may be movable (i.e., extendable and retractable) via threads formed on respective exterior surfaces thereof. It should be appreciated, however, that the extendable tearing arm 296 and the extendable holding arm 300 may be moved by any appropriate means including pneumatic or hydraulic cylinders, a belt drive(s), a rack and pinion(s), a friction drive(s), a ball screw(s), etc.

To ensure proper engagement between the seal tab 276 and the extendable tearing arm 296, in some embodiments of the dispenser 270, the seal tab 276 may be provided with one or more guide holes configured to matingly receive one or more guide pins projecting from the interior surface of the of the door 288. In this manner, a position of the seal tab 276 may be ensured, thereby ensuring proper positioning of the opening 284 of the seal tab 276. Further, in some embodiments of the dispenser 270, the pointed tip 298 of the extendable tearing arm 296 may be inwardly deformable such that as the pointed tip 298 passes through the opening 284 of the seal tab 276, the opening 284 bears against the pointed tip 298 so as to inwardly deform the pointed tip 298 to thereby make passage therethrough easier. It should be appreciated the such inward deformation of the pointed tip 298 may be automated via a rod mechanism housed within the extendable tearing arm 296.

Further, to ensure the frozen edible ingredients 237 are substantially completely expelled from the impermeable pouch 274, the dispensing roller 302 may extend across the entire (or substantially the entire) width of the impermeable pouch 274. Further, although the first side 274A of the impermeable pouch 274 is flexible, an opposite side of the impermeable pouch 274 may be rigid in some embodiments of the dispenser 270 so as to provide a rigid surface upon which the dispensing roller 302 may bear. In addition, the extendable holding arm 300 of the auto-tear mechanism 294 may be moved back into the retracted position before the dispensing roller 302 is moved into the dispense (or lower) position such that the extendable holding arm 300 does not obstruct the flow of the frozen edible ingredients 237 as it is squeezed (or expelled) from the impermeable pouch 274.

Finally, although the dispenser 270 of the present embodiment is described as having only a single dispensing roller 302, it should be appreciated that the dispenser 270 may include any appropriate number of dispensing rollers 302. Such dispensing rollers 302 may be arranged in parallel (i.e., horizontally/in a width direction relative to one another), in series (i.e., vertically/in a length direction relative to one another), or in any other appropriate pattern on one or both sides of the frozen beverage cartridge 272. Further, in addition to or in lieu of the dispensing roller 302 (i.e., a roller), any other appropriate mechanism for squeezing (or expelling) the frozen edible ingredients 237 from the frozen beverage cartridge 272 may be used. In addition, although the frozen beverage cartridge 272 of the present embodiment is described as being opened via a seal formed in the impermeable pouch 274, it should be appreciated that the frozen beverage cartridge 272 may be opened vial a nozzle, etc. in fluid communication with an interior of the impermeable pouch 274.

Referring now to FIGS. 25-28, another embodiment of an individual frozen drink dispenser of the present disclosure is generally indicated at 310. The dispenser 310 of the present embodiment operates substantially similar to the dispensers 210, 270 described above except for some differences, one of which is that the dispenser 310 includes an alternative mechanism for squeezing (or expelling) the frozen edible ingredients 237 from a frozen beverage cartridge 312. Accordingly, a description of redundant components and/or functionalities of the dispenser 310 relative to the dispensers 210, 270 will generally be omitted for the sake of brevity. It should be appreciated, however, that any of the components and/or functionalities of the dispensers 210, 270 described above may be readily adopted and applied to the dispenser 310 of the present embodiment.

Figure 28:
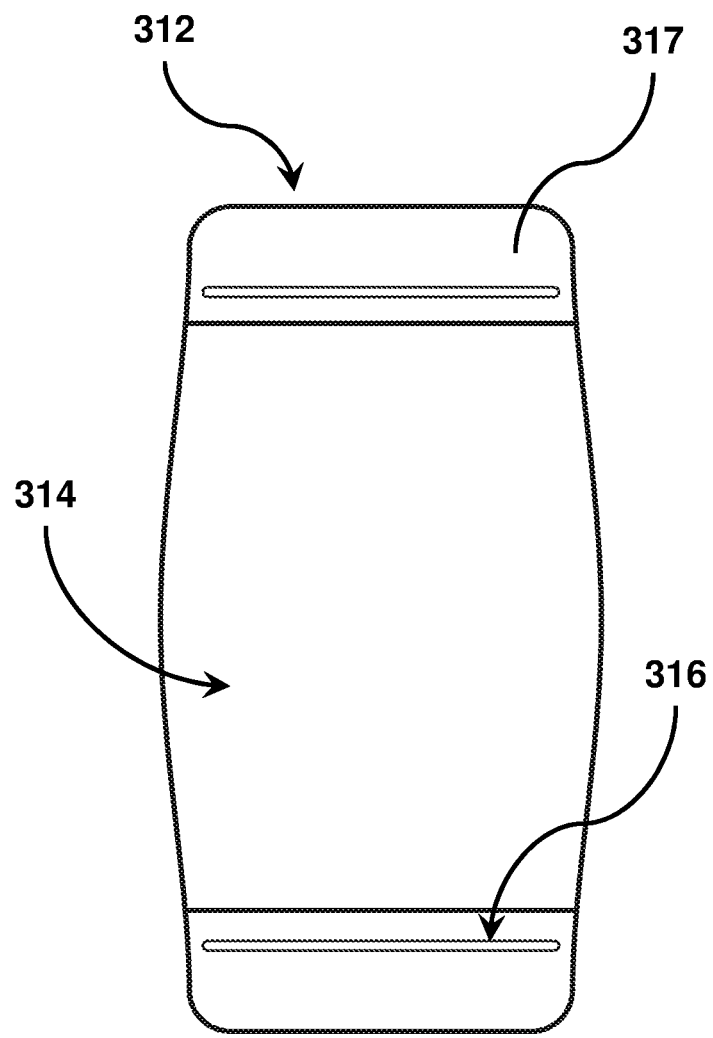
FIG. 28 is a front view of an individual pouch for use with the frozen drink dispenser.

Referring to FIG. 28, the frozen beverage cartridge 312 of the present embodiment includes an impermeable pouch 314. The impermeable pouch 314 is sealed at one end (e.g., a top end or a bottom end) via a breakable (or frangible) seal 316. The breakable seal 316 may be any appropriate type of seal. For example, the breakable seal 316 may be a pressure seal, a heat seal, a zip-top seal, etc. As will be discussed in more detail below, the breakable seal 316 may be used to selectively open the impermeable pouch 314. The frozen beverage cartridge 312 of the present embodiment further includes an insertion tab 317 projecting from an end (e.g., a top end or a bottom end) opposite of the breakable seal 316.

Figure 25:
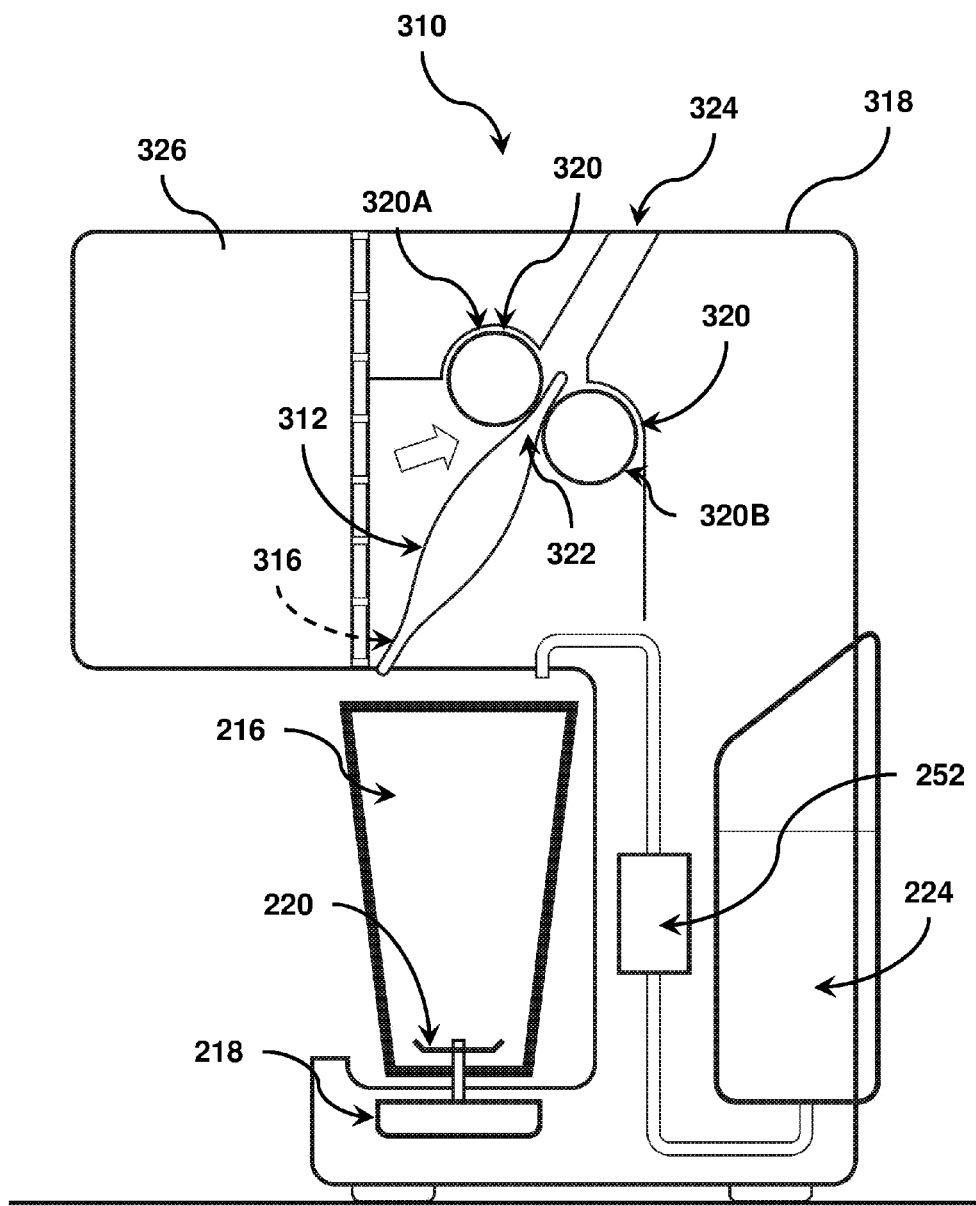
FIG. 25 is a schematic side view of an individual frozen drink dispenser of yet another embodiment of the present disclosure with a door of a dispensing chamber in an open position and with an individual cartridge pouch in a pre-dispense (or lower) position supported between a pair of dispensing rollers.
Figure 26:
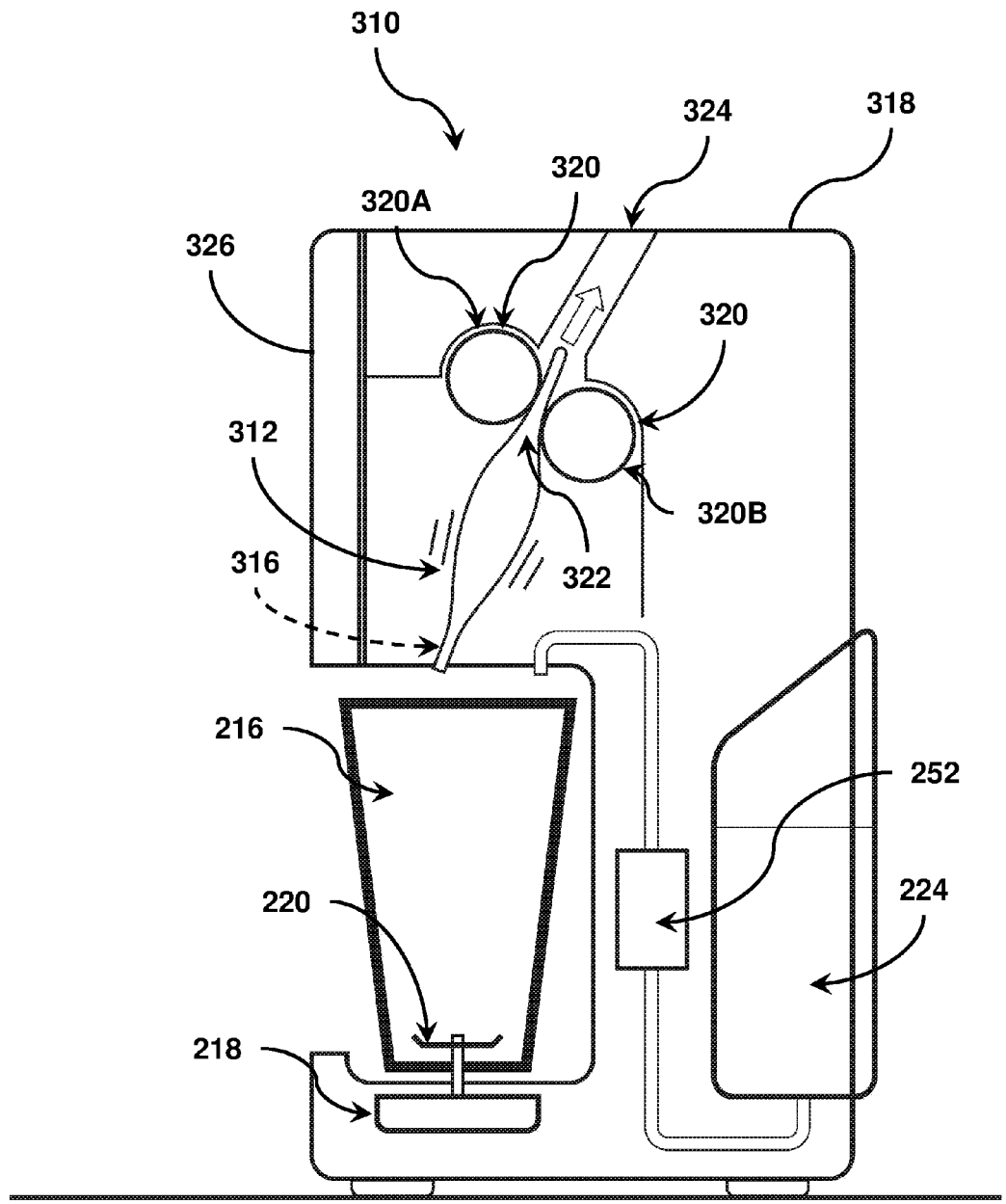
FIG. 26 is a schematic side view of a frozen drink dispenser with the door of the dispensing chamber moved into a closed position and with the individual cartridge pouch being moved from the pre-dispense (or lower) position toward a dispense (or upper) position by the pair of dispensing rollers.
Figure 27:
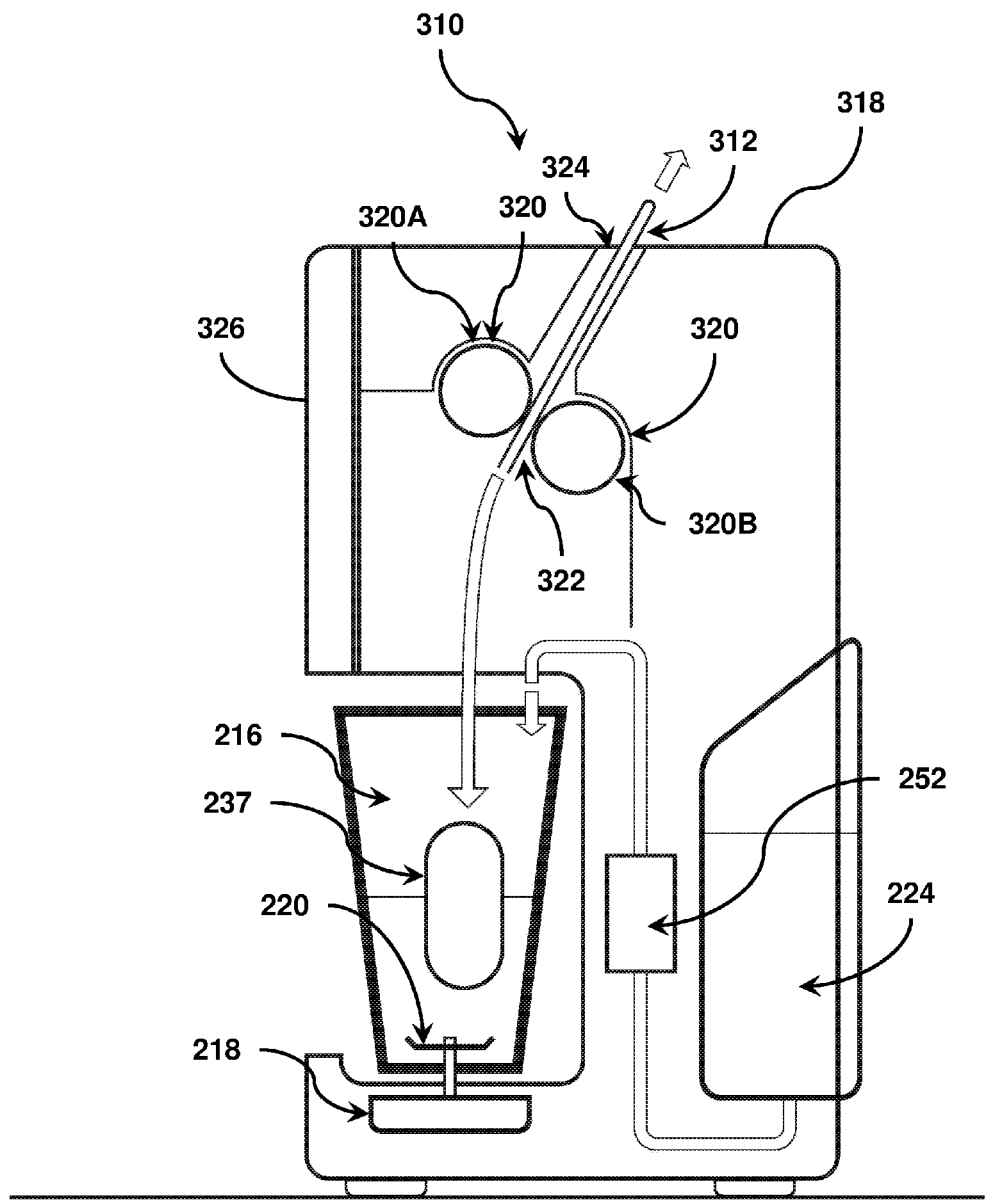
FIG. 27 is a schematic side view of the frozen drink dispenser with the door of the dispensing chamber remaining in the closed position and with the individual cartridge pouch moved into the dispense (or upper) position by the pair of dispensing rollers.

Referring to FIGS. 25-27, a dispensing chamber 318 of the dispenser 310 includes a pair of dispensing rollers 320. The pair of dispensing rollers 320 may be controlled by an electronic control panel or automated in response to closure of a door 326 of the dispensing chamber 318. The dispensing rollers of pair of dispensing rollers 320 are independently and oppositely rotatable. For example, a first dispensing roller 320A of the pair of dispensing rollers 320 may rotate counter-clockwise and a second dispensing roller 320B of the pair of dispensing rollers 320 may rotate clockwise (or vice versa). The first dispensing roller 320A and the second dispensing roller 320B are arranged to oppose one another such that a gap 322 may be provided between the first dispensing roller 320A and the second dispensing roller 320B. The pair of dispensing rollers 320 is positioned adjacent to an inlet of a discharge passage 324 formed in the dispensing chamber 318. Specifically, the gap 322 is positioned at or near the inlet of the discharge passage 324. In this manner, as will be described in more detail below, the frozen beverage cartridge 312 may be received within the gap 322 and passed therethrough into the discharge passage 324 via rotation of the pair of dispensing rollers 320. As will be appreciated from the description below, an exterior surface of the pair of dispensing rollers 320 may be provided with a high friction material (e.g., rubber, polymer, etc.) or surface coating to assist is passing the frozen beverage cartridge 312.

Referring to FIG. 25, with the door 326 of the dispensing chamber 318 in an open position, the insertion tab 317 of the frozen beverage cartridge 312 may be inserted within the gap 322 provided between the first dispensing roller 320A and the second dispensing roller 320B. The gap 322 may be sized so as to effectively secure (or hold) the frozen beverage cartridge 312 in place (i.e., in the pre-dispensed (or lower) position) with the insertion tab 317 inserted therein. Specifically, the gap 322 may be sized such that the pair of dispensing rollers 320 bear against the insertion tab 317 so as to secure the frozen beverage cartridge 312 in place via compression and/or friction.

In some embodiments of the dispenser 310, a mechanism for sensing the initial presence of the insertion tab 317 within the gap 322 may be provided (e.g., a camera, pressure sensor, etc.). In response to sensing the initial presence of the insertion tab 317 within the gap 322, the pair of dispensing rollers 320 may rotate a predetermined amount so as to ensure that the insertion tab 317 is sufficiently received within the gap 322. Additionally or alternatively, in response to sensing the initial presence of the insertion tab 317 within the gap 322, the pair of dispensing rollers 320 may rotate until the insertion tab 317 is sensed as being sufficiently received within the gap 322 (e.g., by a camera, pressure sensor, etc.).

Referring to FIG. 26, after the frozen beverage cartridge 312 is secured by the pair of dispensing rollers 320, the door 326 may be moved into a closed position. At this time, the pair of dispensing rollers 320 may begin to rotate. Specifically, the first dispensing roller 320A may begin to rotate counter-clockwise and the second dispensing roller 320B may begin to rotate clockwise. In this manner, the frozen beverage cartridge 312 is passed through the gap 322 into the discharge passage 324 and toward a dispense (or upper) position. As the frozen beverage cartridge 312 is passed through the gap 322, the pair of dispensing rollers 320 bears against opposing sides of the impermeable pouch 314 initially at a position near the insertion tab 317 (i.e., at a position above the frozen edible ingredients 237 within the impermeable pouch 314). At least one side of the impermeable pouch 314 is flexible such that force applied to the impermeable pouch 314 is imparted upon the frozen edible ingredients 237 within the impermeable pouch 314. As the frozen beverage cartridge 312 is passed through the gap 322, the pair of dispensing rollers 320 continues to bear against the opposing sides of the impermeable pouch 314. In this manner, the pair of dispensing rollers 320 squeezes the frozen edible ingredients 237 downward within the impermeable pouch 314. This downward movement of the frozen edible ingredients 237 applies pressure to the breakable seal 316. At some point, as the frozen beverage cartridge 312 is further passed through the gap 322, the breakable seal 316 is broken by this pressure as it reaches a sufficient threshold to break the breakable seal 316. It should be appreciated that in some embodiments of the dispenser 310, the breakable seal 316 may be partially or fully broken prior to the frozen beverage cartridge 312 being inserted within the dispenser 310 thereby alleviating some or all of the pressure required to break the breakable seal 316.

Referring to FIG. 27, once the breakable seal 316 is broken, the frozen beverage cartridge 312 is further passed through the gap 322 and the pair of dispensing rollers 320 squeezes the frozen edible ingredients 237 downward and out of the impermeable pouch 314 via the opening formed at the breakable seal 316. The frozen edible ingredients 237 squeezed (or expelled) from the impermeable pouch 314 are received within the blender cup 216 positioned beneath the impermeable pouch 314. During this time, the depleted frozen beverage cartridge 312 is passed through the discharge passage 324 to an exterior of the dispenser 310 such that the depleted frozen beverage cartridge 312 may be easily disposed of by a user. It should be appreciated that in some embodiments of the dispenser 310, the discharge passage 324 may lead to a removable discharge container provided within the dispenser 310 for receiving and accumulating depleted frozen beverage cartridges 312. In this manner, a user would not necessarily be required to dispose of each depleted frozen beverage cartridge 312 after every use. Instead, a user would only need to empty the removable discharge container once it became full. In such embodiments of the dispenser 310, a mechanism for determining or sensing the fullness of the removable discharge container (e.g., a counter, a camera, etc.) may be provided.

Further, to ensure the frozen edible ingredients 237 are substantially completely expelled from the impermeable pouch 314, the first dispensing roller 320A and the second dispensing roller 320B may extend across the entire (or substantially the entire) width of the impermeable pouch 314. Further, although at least one side of the impermeable pouch 314 is flexible, one side of the impermeable pouch 314 may be rigid in some embodiments of the dispenser 310 so as to provide a rigid surface upon which the first dispensing roller 320A and/or the second dispensing roller 320B may bear.

Finally, although the dispenser 310 of the present embodiment is described as having only a single dispensing roller 320A, 320B on each side of the frozen beverage cartridge 312, it should be appreciated that the dispenser 310 may include any appropriate number of dispensing rollers 320A, 320B on each side of the frozen beverage cartridge 312. Such dispensing rollers 320A, 320B may be arranged in parallel (i.e., horizontally/in a width direction relative to one another), in series (i.e., vertically/in a length direction relative to one another), or in any other appropriate pattern. Further, in addition to or in lieu of the dispensing rollers 320A, 320B (i.e., a roller), any other appropriate mechanism for squeezing (or expelling) the frozen edible ingredients 237 from the frozen beverage cartridge 312 may be used. In addition, although the frozen beverage cartridge 312 of the present embodiment is described as being opened via a seal formed in the impermeable pouch 314, it should be appreciated that the frozen beverage cartridge 312 may be opened vial a nozzle, etc. in fluid communication with an interior of the impermeable pouch 314.

Having thus described a number of embodiments of the present disclosure, various alternations, modifications and improvements will readily occur to those skilled in the art. Such alterations, modifications and improvements are intended to be within the scope and spirit of the disclosure. Accordingly, the foregoing description is by way of example only and is not intended to be limiting. The disclosure's limit is defined only in the following claims and equivalents thereto.

What is claimed is:

1. An individual frozen drink dispenser comprising:
    a blender drive configured to drive operation of blades within a mixing cup;
    a dispensing chamber configured to receive a frozen beverage container comprising frozen edible ingredients, the dispensing chamber comprising at least one dispensing roller configured to bear against at least one side of the frozen beverage container along a length of the frozen beverage container to squeeze the contents of the frozen beverage container from the frozen beverage container into the mixing cup for making a frozen drink; and
    a controller coupled to the blender drive, the at least one dispensing roller, and a water pump to control the operation of the individual frozen drink dispenser.

2. The individual frozen drink dispenser of claim 1, wherein the at least one dispensing roller is movable relative to the frozen beverage container from a pre-dispense position to a dispense position along the length of the frozen beverage container.

3. The individual frozen drink dispenser of claim 1, wherein the frozen beverage container is movable relative to the at least one dispensing roller from a pre-dispense position to a dispense position along the length of the frozen beverage container.

4. The individual frozen drink dispenser of claim 1, wherein the at least one side of the frozen beverage container is flexible.

5. The individual frozen drink dispenser of claim 1, wherein the dispensing chamber further comprises a door configured to secure the frozen beverage container in place.

6. The individual frozen drink dispenser of claim 1, wherein the frozen beverage container comprises an impermeable pouch and a seal tab projecting from an end of the impermeable pouch; and
    wherein the seal tab is secured to the impermeable pouch along a tear line.

7. The individual frozen drink dispenser of claim 1, wherein the dispensing chamber further comprises an auto-tear mechanism configured to automatically open the frozen beverage container at one end.

8. The individual frozen drink dispenser of claim 7, wherein the auto-tear mechanism comprises:
    a movable holding arm configured to secure the frozen beverage container; and
    a movable tearing arm configured to grasp and tear open the frozen beverage container.

9. The individual frozen drink dispenser of claim 8, wherein the frozen beverage container comprises an impermeable pouch and a seal tab projecting from an end of the impermeable pouch; and
    wherein the seal tab comprises an opening configured to receive a tip of the movable tearing arm.

10. The individual frozen drink dispenser of claim 1, wherein the frozen beverage container comprises a breakable seal.

11. The individual frozen drink dispenser of claim 1, wherein the dispensing chamber further comprises a discharge passage configured to receive and discharge a depleted frozen beverage container.

12. A method of dispensing a frozen drink, the method comprising:

providing an individual frozen drink dispenser comprising:
- a blender drive configured to drive operation of blades within a mixing cup,
- a dispensing chamber configured to receive a frozen beverage container comprising frozen edible ingredients, the dispensing chamber comprising at least one dispensing roller, and
- a controller coupled to the blender drive, the at least one dispensing roller, and a water pump to control the operation of the individual frozen drink dispenser;

inserting the frozen beverage cartridge into the dispensing chamber;

squeezing the contents of the frozen beverage container from the frozen beverage container into the mixing cup by moving the frozen beverage container or the at least one dispensing roller relative to the other along a length of the frozen beverage container while the at least one dispensing roller bears against at least one side of the frozen beverage container; and blending the contents of the frozen beverage container in the mixing cup with the blades.

13. The method of dispensing a frozen drink of claim 12, wherein the step of squeezing the contents of the frozen beverage container from the frozen beverage cartridge into the mixing cup comprises moving the at least one dispensing roller relative to the frozen beverage cartridge from a pre-dispense position to a dispense position along the length of the frozen beverage container.

14. The method of dispensing a frozen drink of claim 12, wherein the step of squeezing the contents of the frozen beverage container from the frozen beverage container into the mixing cup comprises moving the frozen beverage container relative to the at least one dispensing roller from a pre-dispense position to a dispense position along the length of the frozen beverage container.

15. The method of dispensing a frozen drink of claim 12, further comprising discharging a depleted frozen beverage container.

* * * * *